US012330310B2

(12) United States Patent
Floyd-Jones et al.

(10) Patent No.: US 12,330,310 B2
(45) Date of Patent: Jun. 17, 2025

(54) COLLISION DETECTION USEFUL IN MOTION PLANNING FOR ROBOTICS

(71) Applicant: REALTIME ROBOTICS, INC., Boston, MA (US)

(72) Inventors: William Thomas Floyd-Jones, Boston, MA (US); Sean Michael Murray, Cambridge, MA (US); George Dimitri Konidaris, Boston, MA (US); Daniel Jeremy Sorin, Boston, MA (US)

(73) Assignee: REALTIME ROBOTICS, INC., Boston, MA (US)

( * ) Notice: Subject to any disclaimer, the term of this patent is extended or adjusted under 35 U.S.C. 154(b) by 962 days.

(21) Appl. No.: 17/270,597

(22) PCT Filed: Aug. 6, 2019

(86) PCT No.: PCT/US2019/045270
§ 371 (c)(1),
(2) Date: Feb. 23, 2021

(87) PCT Pub. No.: WO2020/040979
PCT Pub. Date: Feb. 27, 2020

(65) Prior Publication Data
US 2021/0178591 A1 Jun. 17, 2021

Related U.S. Application Data

(60) Provisional application No. 62/722,067, filed on Aug. 23, 2018.

(51) Int. Cl.
*B25J 9/16* (2006.01)
(52) U.S. Cl.
CPC .......... *B25J 9/1666* (2013.01); *B25J 9/1671* (2013.01); *G05B 2219/40438* (2013.01); *G05B 2219/40475* (2013.01)

(58) Field of Classification Search
CPC ........ B25J 9/1666; B25J 9/1671; B25J 5/007; B25J 9/1602; B25J 9/162; B25J 9/1628;
(Continued)

(56) References Cited

U.S. PATENT DOCUMENTS

| | | |
|---|---|---|
| 4,163,183 A | 7/1979 | Dunne et al. |
| 4,300,198 A | 11/1981 | Davini |

(Continued)

FOREIGN PATENT DOCUMENTS

| | | |
|---|---|---|
| CN | 101837591 A | 9/2010 |
| CN | 102814813 A | 12/2012 |

(Continued)

OTHER PUBLICATIONS

Oleynikova, Helen; Millane, Alexander; Taylor, Zachary; Galceran, Enric; Nieto, Juan; Siegwart, Roland "Signed Distance Fields: A Natural Representation for Both Mapping and Planning", 2016 (Year: 2016).*

(Continued)

*Primary Examiner* — Abby Y Lin
*Assistant Examiner* — Esvinder Singh
(74) *Attorney, Agent, or Firm* — Cozen O'Connor

(57) ABSTRACT

Collision detection useful in motion planning for robotics advantageously employs data structure representations of robots, persistent obstacles and transient obstacles in an environment in which a robot will operate. Data structures may take the form of hierarchical data structures ((e.g., octrees, sets of volumes or boxes (e.g., a tree of axis-aligned bounding boxes (AABBs), a tree of oriented (not axis-aligned) bounding boxes, or a tree of spheres)) or non-hierarchical data structures (e.g., Euclidean Distance Fields) Such can result in computational efficiency, reduce memory requirements, and lower power consumption. The collision detection can take the form as a standalone function, pro- (Continued)

viding a Boolean result that can be employed in executing any of a variety of different motion planning algorithms.

34 Claims, 11 Drawing Sheets

(58) Field of Classification Search
CPC ........ B25J 9/163; B25J 9/1656; B25J 9/1664; B25J 9/1674; B25J 9/1676; B25J 11/0095; B25J 13/088; B25J 13/089; B25J 19/063; G05B 2219/40438; G05B 2219/40475; G05B 23/0248; G05B 2219/23447; G05B 2219/33303; G05B 2219/40428; G05B 19/4061; G05B 2219/36468; G05B 2219/37237; G05B 2219/39082; G05B 2219/39091; G05B 2219/39096; G05B 2219/39135; G05B 2219/39315; G05B 2219/40317; G05B 2219/40339; G05B 2219/40362; G05B 2219/40371; G05B 2219/40476; G05B 2219/40492; G05B 2219/40497; G05B 2219/49143; G05B 2219/49145; G05B 2219/49153; G05B 2219/49157
See application file for complete search history.

(56) References Cited

U.S. PATENT DOCUMENTS

| | | |
|---|---|---|
| 4,862,373 A | 8/1989 | Meng |
| 4,949,277 A | 8/1990 | Trovato et al. |
| 5,347,459 A | 9/1994 | Greenspan et al. |
| 5,544,282 A | 8/1996 | Chen et al. |
| 6,004,016 A | 12/1999 | Spector |
| 6,049,756 A | 4/2000 | Libby |
| 6,089,742 A | 7/2000 | Warmerdam et al. |
| 6,259,988 B1 | 7/2001 | Galkowski et al. |
| 6,470,301 B1 | 10/2002 | Barral |
| 6,493,607 B1 | 12/2002 | Bourne et al. |
| 6,526,372 B1 | 2/2003 | Orschel et al. |
| 6,526,373 B1 | 2/2003 | Barral |
| 6,529,852 B2 | 3/2003 | Knoll et al. |
| 6,539,294 B1 | 3/2003 | Kageyama |
| 6,671,582 B1 | 12/2003 | Hanley |
| 7,577,498 B2 | 8/2009 | Jennings et al. |
| 7,609,020 B2 | 10/2009 | Kniss et al. |
| 7,865,277 B1 | 1/2011 | Larson et al. |
| 7,940,023 B2 | 5/2011 | Kniss et al. |
| 8,082,064 B2 | 12/2011 | Kay |
| 8,315,738 B2 | 11/2012 | Chang et al. |
| 8,571,706 B2 | 10/2013 | Zhang et al. |
| 8,666,548 B2 | 3/2014 | Lim |
| 8,825,207 B2 | 9/2014 | Kim et al. |
| 8,825,208 B1 | 9/2014 | Benson |
| 8,855,812 B2 | 10/2014 | Kapoor |
| 8,880,216 B2 | 11/2014 | Izumi et al. |
| 8,972,057 B1 | 3/2015 | Freeman et al. |
| 9,092,698 B2 | 7/2015 | Buehler et al. |
| 9,102,055 B1 | 8/2015 | Konolige et al. |
| 9,227,322 B2 | 1/2016 | Graca et al. |
| 9,280,899 B2 | 3/2016 | Biess et al. |
| 9,327,397 B1 | 5/2016 | Williams et al. |
| 9,333,044 B2 | 5/2016 | Olson |
| 9,434,072 B2 | 9/2016 | Buehler et al. |
| 9,539,058 B2 | 1/2017 | Tsekos et al. |
| 9,632,502 B1 | 4/2017 | Levinson et al. |
| 9,645,577 B1 | 5/2017 | Frazzoli et al. |
| 9,687,982 B1 | 6/2017 | Jules et al. |
| 9,687,983 B1 | 6/2017 | Prats |
| 9,701,015 B2 | 7/2017 | Buehler et al. |
| 9,707,682 B2 | 7/2017 | Konolige et al. |
| 9,731,724 B2 | 8/2017 | Yoon |
| 9,981,382 B1 | 5/2018 | Strauss et al. |
| 9,981,383 B1 | 5/2018 | Nagarajan |
| 10,035,266 B1 | 7/2018 | Kroeger |
| 10,099,372 B2 | 10/2018 | Vu et al. |
| 10,124,488 B2 | 11/2018 | Lee et al. |
| 10,131,053 B1 | 11/2018 | Sampedro et al. |
| 10,300,605 B2 | 5/2019 | Sato |
| 10,303,180 B1* | 5/2019 | Prats ................... G05D 1/0212 |
| 10,430,641 B2 | 10/2019 | Gao |
| 10,705,528 B2 | 7/2020 | Wierzynski et al. |
| 10,723,024 B2 | 7/2020 | Konidaris et al. |
| 10,782,694 B2 | 9/2020 | Zhang et al. |
| 10,792,114 B2 | 10/2020 | Hashimoto et al. |
| 10,959,795 B2 | 3/2021 | Hashimoto et al. |
| 11,358,337 B2 | 6/2022 | Czinger et al. |
| 11,623,494 B1 | 4/2023 | Arnicar et al. |
| 2002/0013675 A1 | 1/2002 | Knoll et al. |
| 2002/0074964 A1 | 6/2002 | Quaschner et al. |
| 2003/0155881 A1 | 8/2003 | Hamann et al. |
| 2004/0249509 A1 | 12/2004 | Rogers et al. |
| 2005/0071048 A1 | 3/2005 | Watanabe et al. |
| 2005/0216181 A1 | 9/2005 | Estkowski et al. |
| 2006/0235610 A1 | 10/2006 | Ariyur et al. |
| 2006/0247852 A1 | 11/2006 | Kortge et al. |
| 2007/0106422 A1 | 5/2007 | Jennings et al. |
| 2007/0112700 A1 | 5/2007 | Den et al. |
| 2008/0012517 A1 | 1/2008 | Kniss et al. |
| 2008/0125893 A1 | 5/2008 | Tilove et al. |
| 2008/0186312 A1 | 8/2008 | Ahn et al. |
| 2008/0234864 A1* | 9/2008 | Sugiura ................. B25J 9/1666 700/255 |
| 2009/0055024 A1 | 2/2009 | Kay |
| 2009/0192710 A1 | 7/2009 | Eidehall et al. |
| 2009/0234499 A1 | 9/2009 | Nielsen et al. |
| 2009/0295323 A1 | 12/2009 | Papiernik et al. |
| 2009/0326711 A1 | 12/2009 | Chang et al. |
| 2009/0326876 A1 | 12/2009 | Miller |
| 2010/0145516 A1 | 6/2010 | Cedoz et al. |
| 2010/0235033 A1 | 9/2010 | Yamamoto et al. |
| 2011/0066282 A1 | 3/2011 | Bosscher et al. |
| 2011/0153080 A1 | 6/2011 | Shapiro et al. |
| 2012/0010772 A1 | 1/2012 | Pack et al. |
| 2012/0083964 A1 | 4/2012 | Montemerlo et al. |
| 2012/0215351 A1 | 8/2012 | McGee et al. |
| 2012/0297733 A1 | 11/2012 | Pierson et al. |
| 2012/0323357 A1 | 12/2012 | Izumi et al. |
| 2013/0346348 A1 | 12/2013 | Buehler et al. |
| 2014/0012419 A1 | 1/2014 | Nakajima |
| 2014/0025201 A1 | 1/2014 | Ryu et al. |
| 2014/0025203 A1 | 1/2014 | Inazumi |
| 2014/0058406 A1 | 2/2014 | Tsekos |
| 2014/0067121 A1 | 3/2014 | Brooks et al. |
| 2014/0079524 A1 | 3/2014 | Shimono et al. |
| 2014/0121833 A1 | 5/2014 | Lee et al. |
| 2014/0121837 A1 | 5/2014 | Hashiguchi et al. |
| 2014/0147240 A1 | 5/2014 | Noda et al. |
| 2014/0156068 A1 | 6/2014 | Graca et al. |
| 2014/0249741 A1 | 9/2014 | Levien et al. |
| 2014/0251702 A1 | 9/2014 | Berger et al. |
| 2014/0309916 A1 | 10/2014 | Bushnell |
| 2015/0005785 A1 | 1/2015 | Olson |
| 2015/0037131 A1 | 2/2015 | Girtman et al. |
| 2015/0051783 A1 | 2/2015 | Tamir et al. |
| 2015/0134111 A1 | 5/2015 | Nakajima |
| 2015/0261899 A1 | 9/2015 | Atohira et al. |
| 2015/0266182 A1 | 9/2015 | Strandberg |
| 2016/0001775 A1 | 1/2016 | Wilhelm et al. |
| 2016/0107313 A1* | 4/2016 | Hoffmann ............. B25J 9/1676 700/255 |
| 2016/0112694 A1 | 4/2016 | Nishi et al. |
| 2016/0121486 A1 | 5/2016 | Lipinski et al. |
| 2016/0121487 A1 | 5/2016 | Mohan et al. |
| 2016/0154408 A1 | 6/2016 | Eade et al. |
| 2016/0299507 A1 | 10/2016 | Shah et al. |
| 2016/0324587 A1 | 11/2016 | Olson |
| 2016/0357187 A1 | 12/2016 | Ansari |
| 2017/0004406 A1 | 1/2017 | Aghamohammadi |
| 2017/0028559 A1 | 2/2017 | Davidi et al. |
| 2017/0120448 A1 | 5/2017 | Lee et al. |
| 2017/0123419 A1 | 5/2017 | Levinson et al. |

(56) References Cited

U.S. PATENT DOCUMENTS

| | | | |
|---|---|---|---|
| 2017/0132334 A1 | 5/2017 | Levinson et al. | |
| 2017/0146999 A1 | 5/2017 | Cherepinsky et al. | |
| 2017/0157769 A1 | 6/2017 | Aghamohammadi et al. | |
| 2017/0168485 A1 | 6/2017 | Berntorp et al. | |
| 2017/0168488 A1 | 6/2017 | Wierzynski et al. | |
| 2017/0193830 A1 | 7/2017 | Fragoso et al. | |
| 2017/0210008 A1 | 7/2017 | Maeda | |
| 2017/0305015 A1 | 10/2017 | Krasny et al. | |
| 2017/0315530 A1 | 11/2017 | Godau et al. | |
| 2018/0001472 A1 | 1/2018 | Konidaris et al. | |
| 2018/0001476 A1 | 1/2018 | Tan et al. | |
| 2018/0029233 A1 | 2/2018 | Lager | |
| 2018/0074505 A1 | 3/2018 | Lv et al. | |
| 2018/0113468 A1 | 4/2018 | Russell | |
| 2018/0136662 A1 | 5/2018 | Kim | |
| 2018/0150077 A1 | 5/2018 | Danielson et al. | |
| 2018/0172450 A1 | 6/2018 | Lalonde et al. | |
| 2018/0173242 A1 | 6/2018 | Lalonde et al. | |
| 2018/0189683 A1 | 7/2018 | Newman | |
| 2018/0222051 A1 | 8/2018 | Vu et al. | |
| 2018/0229368 A1 | 8/2018 | Leitner et al. | |
| 2018/0281786 A1 | 10/2018 | Oyaizu et al. | |
| 2018/0339456 A1 | 11/2018 | Czinger et al. | |
| 2019/0015981 A1* | 1/2019 | Yabushita | B25J 9/162 |
| 2019/0039242 A1* | 2/2019 | Fujii | G05B 19/19 |
| 2019/0143518 A1 | 5/2019 | Maeda | |
| 2019/0163191 A1 | 5/2019 | Sorin et al. | |
| 2019/0164430 A1 | 5/2019 | Nix | |
| 2019/0196480 A1 | 6/2019 | Taylor | |
| 2019/0232496 A1 | 8/2019 | Graichen et al. | |
| 2019/0262993 A1 | 8/2019 | Cole et al. | |
| 2019/0293443 A1 | 9/2019 | Kelly et al. | |
| 2019/0391597 A1 | 12/2019 | Dupuis | |
| 2020/0069134 A1 | 3/2020 | Ebrahimi Afrouzi et al. | |
| 2020/0097014 A1 | 3/2020 | Wang | |
| 2020/0331146 A1 | 10/2020 | Vu et al. | |
| 2020/0338730 A1 | 10/2020 | Yamauchi et al. | |
| 2020/0338733 A1 | 10/2020 | Dupuis et al. | |
| 2020/0353917 A1 | 11/2020 | Leitermann et al. | |
| 2020/0368910 A1 | 11/2020 | Chu et al. | |
| 2021/0009351 A1 | 1/2021 | Beinhofer et al. | |
| 2022/0339875 A1 | 10/2022 | Czinger et al. | |
| 2023/0063205 A1 | 3/2023 | Nerkar | |

FOREIGN PATENT DOCUMENTS

| | | | | |
|---|---|---|---|---|
| CN | 104858876 A | 8/2015 | | |
| CN | 106660208 A | 5/2017 | | |
| CN | 107073710 A | 8/2017 | | |
| CN | 107206592 A | 9/2017 | | |
| CN | 107486858 A | 12/2017 | | |
| CN | 108789416 A | 11/2018 | | |
| CN | 108858183 A | 11/2018 | | |
| CN | 108942920 A | 12/2018 | | |
| EP | 1901150 A1 | 3/2008 | | |
| EP | 2306153 A2 | 4/2011 | | |
| EP | 3250347 A1 | 12/2017 | | |
| EP | 3486612 A1 | 5/2019 | | |
| EP | 3725472 A1 | 10/2020 | | |
| JP | 11296229 A | 10/1999 | | |
| JP | 2002073130 A | 3/2002 | | |
| JP | 2003127077 A | 5/2003 | | |
| JP | 2005032196 A | 2/2005 | | |
| JP | 2006224740 A | 8/2006 | | |
| JP | 2007257274 A | 10/2007 | | |
| JP | 2008065755 A | 3/2008 | | |
| JP | 2010061293 A | 3/2010 | | |
| JP | 2011075382 A | 4/2011 | | |
| JP | 2011249711 A | 12/2011 | | |
| JP | 2012056023 A | 3/2012 | | |
| JP | 2012190405 A | 10/2012 | | |
| JP | 2012243029 A | 12/2012 | | |
| JP | 2013193194 A | 9/2013 | | |
| JP | 2014184498 A | 10/2014 | | |
| JP | 2015044274 A | 3/2015 | | |
| JP | 2015517142 A | 6/2015 | | |
| JP | 2015208811 A | 11/2015 | | |
| JP | 2017131973 A | 8/2017 | | |
| JP | 2018505788 A | 3/2018 | | |
| KR | 19980024584 A | 7/1998 | | |
| KR | 20110026776 A | 3/2011 | | |
| KR | 20130112507 A | 10/2013 | | |
| KR | 20150126482 A | 11/2015 | | |
| KR | 20170018564 A | 2/2017 | | |
| KR | 20170044987 A | 4/2017 | | |
| KR | 20170050166 A | 5/2017 | | |
| KR | 20180125646 A | 11/2018 | | |
| TW | 201318793 A | 5/2013 | | |
| WO | 9924914 A1 | 5/1999 | | |
| WO | 2015113203 A1 | 8/2015 | | |
| WO | WO-2016122840 A1 * | 8/2016 | | B25J 9/1666 |
| WO | 2017168187 A1 | 10/2017 | | |
| WO | 2017214581 A1 | 12/2017 | | |
| WO | 2019183141 A1 | 9/2019 | | |
| WO | 2020040979 A1 | 2/2020 | | |
| WO | 2020117958 A1 | 6/2020 | | |

OTHER PUBLICATIONS

Non-Final Office Action Issued in U.S. Appl. No. 16/268,290, Mailed Date: Jun. 17, 2021, 35 pages.
Barral D et al: "Simulated Annealing Combined With a Constructive Algorithm for Optimising Assembly Workcell Layout", The International Journal of Advanced Manufacturing Technology, Springer, London, vol. 17, No. 8, Jan. 1, 2001, 10 pages.
Extended EP Search Report mailed Nov. 7, 2022, EP App No. 21744840.6-1205, 14 pages.
Klampfl Erica et al: "Optimization of workcell layouts in a mixed-model assembly line environment", International Journal of Flexible Manufacturing Systems, Kluwer Academic Publishers, Boston, vol. 17, No. 4, 23 pages, Oct. 10, 2006.
Long Tao et al: "Optimization on multi-robot workcell layout in vertical plane", Information and Automation (ICIA), 2011 IEEE International Conference on, IEEE, Jun. 6, 2011, 6 pages.
Pashkevich AP et al: "Multiobjective optimisation of robot location in a workcell using genetic algorithms", Control '98. UKACC International Conference on (Conf. Publ. No. 455) Swansea, UK Sep. 1-4, 1998, London, UK, vol. 1, Sep. 1, 1998, 6 pages.
Zhen Yang et al: "Multi-objective hybrid algorithms for layout optimization in multi-robot cellular manufacturing systems", Knowledge-Based Systems, Elsevier, Amsterdam, NL, vol. 120, Jan. 3, 2017, 12 pages.
Final Office Action mailed Aug. 2, 2021 for U.S. Appl. No. 16/240,086 in 66 pages.
International Search Report and Written Opinion for PCT/US2021/061427, mailed Apr. 29, 2022, 14 pages.
Non-Final Office Action Issued in U.S. Appl. No. 16/909,096 Mailed May 6, 2022, 49 pages.
Bharathi Akilan et al: "Feedrate optimization for smooth minimum-time trajectory generation with higher order constraints", The International Journal of Advanced Manufacturing Technology,vol. 82, No. 5, Jun. 28, 2015 (Jun. 28, 2015), pp. 1029-1040.
Dong et al: "Feed-rate optimization with jerk constraints for generating minimum-time trajectories", International Journal of Machine Tool Design and Research, Pergamon Press, Oxford, GB, vol. 47, No. 12-13, Aug. 9, 2007 (Aug. 9, 2007), pp. 1941-1955.
Extended EP Search Report mailed Jul. 18, 2022 EP App No. 20832308.9-1205, 10 pages.
Extended EP Search Report mailed Jul. 25, 2022 EP App No. 20857383.2-1205, 10 pages.
Sonja MacFarlane et al: "Jerk-Bounded Manipulator Trajectory Planning: Design for Real-Time Applications", IEEE Transactions on Robotics and Automation, IEEE Inc, New York, US, vol. 19, No. 1, Feb. 1, 2003 (Feb. 1, 2003), XP011079596, ISSN: 1042-296X.
Final Office Action mailed Sep. 7, 2022, for U.S. Appl. No. 16/909,096, 54 pages.
Gasparetto A et al: "Experimental validation and comparative analysis of optimal time-jerk algorithms for trajectory planning",

(56) References Cited

OTHER PUBLICATIONS

Robotics and Computer Integrated Manufacturing, Elsevier Science Publishers BV. , Barking, GB, vol. 28, No. 2, Aug. 5, 2011.
Gasparetto et al: "A new method for smooth trajectory planning of robot manipulators", Mechanism and Machine Theory, Pergamon, Amsterdam, NL, vol. 42, No. 4, Jan. 26, 2007.
Haschke R et al: "On-Line Planning of Time-Opti.mal, Jerk-Limited Trajectories", Internet Citation, Jul. 1, 2008 (Jul. 1, 2008), pp. 1-6, XP00278977 6.
Jan Mattmuller et al: "Calculating a near time-optimal jerk-constrained trajectory along a specified smooth path", The International Journal of Advanced Manufacturing Technology, Springer, Berlin, DE, vol. 45, No. 9-10, Apr. 19, 2009.
Lin Jianjie et al: "An Efficient and Time-Optimal Trajectory Generation Approach for Waypoints Under Kinematic Constraints and Error Bounds", 2018 IEEE/RSJ International Conference on Intelligent Robots and Systems (IROS), IEEE, Oct. 1, 2018.
Non Final Office Action for U.S. Appl. No. 16/883,376, mailed Sep. 27, 2022, 26 pages.
Non-Final Office Action malled Sep. 14, 2022, for U.S. Appl. No. 16/999,339, 18 pages.
Ratliff, et al., "CHOMP: Gradient Optimization Techniques for Efficient Motion Planning", 2009 IEEE International Conferenced on Robotics and Automation, Kobe, Japan, May 12-17, 2009, 6 pages.
S. Saravana Perumaal et al: "Automated Trajectory Planner of Industrial Robot for Pick-and-Place Task", International Journal of Advanced Robotic Systems, vol. 10, No. 2, Jan. 1, 2013.
Notice of Reasons for Rejection dated Feb. 16, 2023, for Japanese Application No. 2021-571340, 10 pages.
Office Action issued in Taiwan Application No. 108104094, mailed Feb. 6, 2023, 24 pages.
European Search Report dated Jul. 23, 2021, for European Application No. 19851097.6, 15 pages.
Taiwanese First Office Action—Application No. 106119452 dated Jun. 18, 2021, 25 pages.
Corrales, J.A., et al., Safe Human-robot interaction based on dynamic sphere-swept line bounding volumes, Robotic and Computer-Integrated Manufacturing 27 (2011) 177-185, 9 page.
Pobil, Angel P, et al., "A New Representation for Collision Avoidance and Detection", Proceedings of the 1992 IEEE, XP000300485, pp. 246-251.
Sato, Yuichi , et al., "Efficient Collision Detection using Fast Distance-Calculation Algorithms for Convex and Non-Convex Objects", Proceeding of the 1996 IEEE, XP-000750294, 8 pages.
Turrillas, Alexander Martin, "Improvement of a Multi-Body Collision Computation Framework and Its Application to Robot (Self-) Collision Avoidance", German Aerospace Center (DLR). Master's Thesis, Jun. 1, 2015, 34 pages.
Japanese Office Action, Japanese Application No. 2021-576425, Mar. 13, 2023, 14 pages.
Notice of Allowance mailed Sep. 23, 2021, for Ritchey, "Motion Planning for Autonomous Vehicles and Reconfigurable Motion Planning Processors," U.S. Appl. No. 16/615,493, 11 pages.
Notice of Allowance mailed Sep. 24, 2021, for Ritchey, "Motion Planning of a Robot Storing a Discretized Environment on One or More Processors and Improved Operation of Same," U.S. Appl. No. 16/268,290, 8 pages.
Communication Pursuant to Article 94(3) EPC, issued in European Application No. 17811131.6, Mailed Date: Jun. 16, 2020, 5 pages.
Communication Pursuant to Article 94(3) EPC, issued in European Application No. 18209405.2, Mailed Date: Nov. 23, 2020, 4 pages.
European Search Report, Mailed Date: Nov. 17, 2020 for EP Application No. 16743821.7, 4 pages.
Extended European Search Report issued in European Application No. 17811131.6, Mailed Date: Apr. 24, 2019, 16 pages.
Extended European Search Report issued in European Application No. 18209405.2, Mailed Date: Aug. 2, 2019, 9 pages.
Extended European Search Report, Mailed Date: Apr. 10, 2018 for EP Application No. 16743821.7, in 9 pages.
First Office Action issued in Chinese No. 201680006941.3 with English translation, Mailed Date: Sep. 29, 2019, 16 pages.
First Office Action issued in Japanese Patent Application No. 2017-557268, Mailed Date: Aug. 7, 2018, 15 pages.
International Search Report and Written Opinion for PCT/US2019/016700, Mailed Date: May 20, 2019, 14 pages.
International Search Report and Written Opinion for PCT/US2019/023031, Mailed Date: Aug. 14, 2019 in 19 pages.
International Search Report and Written Opinion for PCT/US2019/064511, Mailed Date: Mar. 27, 2020, 10 pages.
International Search Report and Written Opinion issued in PCT Application No. PCT/2020/034551, Mailed Date: Aug. 31, 2020, 18 pages.
International Search Report and Written Opinion issued in PCT Application No. PCT/US2016/012204; Mailed Date: Mar. 21, 2016, 10 pages.
International Search Report and Written Opinion issued in PCT Application No. PCT/US2017/036880; Mailed Date: Oct. 10, 2017, 15 pages.
International Search Report and Written Opinion issued in PCT Application No. PCT/US2019/045270; Mailed Date: Nov. 25, 2019, 11 pages.
International Search Report and Written Opinion issued in PCT/US2019/012209, Mailed Date: Apr. 25, 2019, 24 pages.
International Search Report and Written Opinion, Mailed Date: Jul. 29, 2020, in PCT/US2020/028343, 11 pages.
International Search Report and Written Opinion, Mailed Date: Nov. 23, 2020, for PCT/US2020/047429, 11 Pages.
International Search Report and Written Opinion, Mailed Date: Sep. 29, 2020 for PCT/US2020/039193, 9 pages.
Invitation to Pay Additional Fees and, Where Applicable, Protest Fee issued in PCT/US2017/036880, Mailed Date: Aug. 14, 2017, 2 pages.
Non-Final Office Action Issued in U.S. Appl. No. 16/240,086, Mailed Date: Feb. 11, 2021, 79 pages.
Non-Final Office Action Issued in U.S. Appl. No. 16/268,290, Mailed Date: Jan. 27, 2021, 54 pages.
Non-Final Office Action Issued in U.S. Appl. No. 16/308,693, Mailed Date: Dec. 11, 2020, 17 pages.
Non-Final Office Action Issued in U.S. Appl. No. 16/308,693, Mailed Date: Jun. 1, 2020, 16 pages.
Non-Final Office Action Issued in U.S. Appl. No. 15/546,441, Mailed Sep. 17, 2019, 58 Pages.
Office Action Issued in Japanese Application No. 2018-564836, Mailed Date: Dec. 3, 2019, 3 Pages.
Office Action Issued in Japanese Application No. 2018-564836, Mailed Date: May 19, 2020, 5 Pages.
or.pdf (Or | Definition of or by Merriam-Webster, Sep. 9, 2019, https://www.merriam-webster.com/dictionary/or, pp. 1-12; Year: 2019.
Second Office Action issued in Japanese Patent Application No. 2017-557268, Mailed Date: Feb. 26, 2019, 5 pages.
Atay, Nuzhet , et al., "A Motion Planning Processor on Reconfigurable Hardware", All Computer Science and Engineering Research, Computer Science and Engineering; Report No. WUCSE-2005-46; Sep. 23, 2005.
Hauck, Scott , et al., "Configuration Compression for the Xilinx XC6200 FPGA", IEEE Transactions on Computer-Aided Design of Integrated Circuits and Systems, vol. 18, No. 8; Aug. 1999.
Johnson, David E., et al., "Bound Coherence for Minimum Distance Computations", Proceedings of the 1999 IEEE International Conference on Robotics and Automation, May 1999.
Kavraki, L.E. , et al., "Probabilistic Roadmaps for Path Planning in High-Dimensional Configuration Spaces", IEEE Transactions on Robotics and Automation, IEEE Inc.; vol. 12, No. 4, pp. 566-580; Aug. 1, 1996.
Murray, Sean , et al., "Robot Motion Planning on a Chip", Robotics: Science and Systems 2016; Jun. 22, 2016; 9 pages.
Murray, Sean , et al., "The microarchitecture of a real-time robot motion planning accelerator", 2016 49th Annual IEEE/ACM International Symposium on Microarchitecture (Micro), IEEE, Oct. 15, 2016, 12 pages.

(56) References Cited

OTHER PUBLICATIONS

Rodriguez, Carlos, et al., "Planning manipulation movements of a dual-arm system considering obstacle removing", Robotics and Autonomous Systems, Elsevier Science Publishers, vol. 62, No. 12, pp. 1816-1826; Aug. 1, 2014.
Stilman, Mike, et al., "Manipulation Planning Among Movable Obstacles", Proceedings of the IEEE Int. Conf. on Robotics and Automation, Apr. 2007.
Siciliano et al. "Robotics. Modelling, Planning and Control", Chapter 12: Motion Planning, pp. 523-559, 2009.
Chen, Chao, Motion Planning for Nonholonomic Vehicles with Space Exploration Guided Heuristic Search, 2016, IEEE.com, Whole Document, 140 pages.
Pan, Jia, et al., Efficient Configuration Space Construction and Optimization for Motion Planning, 2015, Research Robotics, Whole Document, 12 pages.
Hassan, "Modeling and Stochastic Optimization of Complete Coverage under Uncertainties in Multi-Robot Base Placements," 2016, Intelligent Robots and Systems (IROS} (Year: 2016).
Hassan, et al., "An Approach to Base Placement for Effective Collaboration of Multiple Autonomous Industrial Robots," 2015 IEEE International Conference on Robotics and Automation (ICRA}, pp. 3286-3291 (Year: 2015).
Hassan, et al., "Simultaneous area partitioning and allocation for complete coverage by multiple autonomous industrial robots," 2017, Autonomous Robots 41, pp. 1609-1628 (Year: 2017).
Hassan, et al., "Task Oriented Area Partitioning and Allocation for Optimal Operation of Multiple Industrial Robots in Unstructured Environments," 2014, 13th International Conference on Control, Automation, Robotics & Vision (ICARCV 2014), pp. 1184-1189.
Kalawoun, "Motion planning of multi-robot system for airplane stripping," 2019, Universite Clermont Auvergne (Year: 2019).
Kapanoglu, et al., "A pattern-based genetic algorithm for multi-robot coverage path planning minimizing completion time," 2012, Journal of Intelligent Manufacturing 23, pp. 1035-1045 (Year: 2012).
Notice of Allowance for U.S. Appl. No. 17/153,662, mailed Dec. 6, 2022, 15 pages.
Pires, et al., "Robot Trajectory Planning Using Multi-objective Genetic Algorithm Optimization," 2004, Genetic and Evolutionary Computation—GECCO 2004, pp. 615-626 (Year: 2004).
Non-Final Office Action Issued in U.S. Appl. No. 16/308,693, Mailed May 14, 2021, 16 pages.
Extended EP Search Report mailed May 10, 2023, EP App No. 20818760.9-1012, 9 pages.
First Office Action and Search Report issued in Chinese No. 202080040382.4 with English translation, Mailed Date: May 26, 2023, 15 pages.
First Office Action issued in Chinese No. 202080059714.3 with English translation, Mailed Date: May 24, 2023, 24 pages.
Li, et al., "A Novel Cost Function for Decision-Making Strategies in Automotive Collision Avoidance Systems", 2018 IEEE, ICVES, 8 pages.
Non-Final Office Action Issued in U.S. Appl. No. 17/506,364, Mailed Apr. 28, 2023, 50 pages.
Schwesinger, "Motion Planning n Dynamic Environments with Application to Self-Driving Vehicles", Dr. Andreas Krause, Jan. 1, 2017, XP093029842.
First Office Action issued in Chinese No. 201980024188.4 with English translation, Mailed Date: Feb. 22, 2023, 28 pages.
Non-Final Office Action Issued in U.S. Appl. No. 16/981,467, Mailed Mar. 16, 2023, 19 Pages.
Notice of Reasons for Rejection dated Feb. 7, 2023, for Japanese Application No. 2022-054900, 7 pages.
European Search Report issued in European Application No. 19771537.8, Mailed Date: Mar. 29, 2021, 8 pages.
Final Office Action Issued in U.S. Appl. No. 16/268,290, Mailed Date: Apr. 21, 2021, 58 pages.
Murray, Sean, et al., "Robot Motion Planning on a Chip", Robotics: Science and Systems, Jan. 1, 2016, 9 pages.
Rodriguez, Carlos, et al., "Planning manipulation movements of a dual-arm system considering obstacle removing", Robotics and Autonomous Systems 62 (2014), Elsevier, Journal homepage: www.elsevier.com/locate/robot, pp. 1816-1826.

\* cited by examiner

COLLISION DETECTION USEFUL IN MOTION PLANNING FOR ROBOTICS

TECHNICAL FIELD

The present disclosure generally relates to robot motion planning, and in particular to systems and methods that perform collision detection via processor circuitry to produce motion plans to drive robots and the like.

BACKGROUND

Description of the Related Art

Motion planning is a fundamental problem in robot control and robotics. A motion plan completely specifies a path a robot can follow from a starting state to a goal state, typically without colliding with any obstacles in an operational environment or with a reduced possibility of colliding with any obstacles in the operational environment. Challenges to motion planning involve the ability to perform motion planning at very fast speeds even as characteristics of the environment change. For example, characteristics such as location or shape of one or more obstacles in the environment may change over time. Also for example, characteristics such as location or shape of a portion of the robot itself may change over time, for instance an end effector or end of arm tool can have a gasping configuration and an un-grasped configuration. Challenges further include performing motion planning using relatively low cost equipment, at relative low energy consumption and with limited amounts of storage (e.g., memory circuits, for instance on processor chip circuitry).

BRIEF SUMMARY

A wide variety of algorithms are used to solve motion planning problems. Each of these algorithms typically need to be able to determine whether a given pose of a robot or a motion from one pose to another pose results in a collision, either with the robot itself or with obstacles in the environment.

Collision detection hardware, software and/or firmware described herein can determine or compute whether a single robot pose or a robot motion from one pose (e.g., a start pose) to another pose (e.g., an end pose) causes a robot to collide with either itself or with any obstacles in a current environment in which the robot operates. The environment may include obstacles, that is objects (e.g., inanimate objects, animate objects including people and other animals) that present a risk of collision. The environment may or may not include one or more target objects, that is objects with which the robot is to engage. For some of the obstacles, a respective volume occupied by the obstacles is known at a time at which a model or computational circuitry of a motion planner is configured, a time denominated as configuration time, and is expected to remain fixed or unchanged through robot operation, a time denominated as run time. These obstacles are denominated as persistent obstacles since a volume the obstacle(s) occupies is known during configuration time and is expected to stay fixed or unchanged through run time. For other obstacles, a respective volume the obstacle(s) occupy is not known at the configuration time, and is only determined at run time. These obstacles are denominated as transient obstacles since a volume the obstacle(s) occupy is not known during configuration time. A respective volume occupied by one or more of these transitory obstacles may be fixed or non-moving or non-changing over time and denominated as a static obstacles. A respective volume occupied by one or more of these transitory obstacles may be moving or changing over time and denominated as a dynamic obstacles.

The collision detection hardware, software and/or firmware described herein can be implemented as a subroutine or function which can be called or invoked by various different motion planning algorithms for instance probabilistic road map (PRM), rapidly exploring random tree (RRT), RRT*, bi-directional RRT, etc. algorithms. The collision detection hardware, software and/or firmware described herein can also be used to accelerate grasp planning by quickly evaluating many candidate grasp poses.

Various implementations described herein typically employ two or three configuration time inputs: i) a kinematic model of the robot; ii) a representation of persistent obstacles in the environment that at configuration time have a known volume that they occupy in the environment; and optionally a motion subdivision granularity value or specification. The kinematic model of the robot includes constraints (e.g., a minimum and maximum angle of an elbow joint) on any of a number of joints of the robot, a transformation from each link of a robot to a respective parent link of the robot, an axis of each joint of the robot, and a specification of a geometry of each link of the robot.

Various implementations described herein typically employ two or three run time inputs: a) start pose; b) optionally an end pose if motion is being evaluated; and a representation of transient obstacles in the environment that at run time have a known volume that they occupy in the environment, and that at configuration time a volume that they occupy in the environment is not known. Transient obstacles may be static (i.e., fixed or not moving or not changing shape during a relevant or run time period) or dynamic (i.e., moving or changing shape during at least a portion of the relevant or run time period). For a robot with a number D degrees of freedom, a pose may be specified as a D-tuple, where each element of the tuple specifies a position or rotation of that degree of freedom (joint).

Implementing efficient hardware for collision detection can be realized via careful attention to the selection of data structures to represent objects, poses, and/or motions. Well-chosen data structures can advantageously reduce the amount of memory required for storage, the amount of hardware required for collision detection, the latency to perform collision detection, and power consumption. A number of exemplary data structures are described herein which may be suitable, although one of skill in the art will recognize that other structures could be employed used based on the teachings herein. There are a variety of options, each option associated with a respective tradeoff between latency of collision detection, latency to construct the data structure, and suitability of the data structure to a geometry of the object(s) being represented.

A method of operation of at least one component of a processor-based system useful in motion planning for robotics may be summarized as including for each of at least a first number of poses of a robot, determining, by at least one set of circuitry, whether any portion of the robot will collide with another portion of the robot based at least in part on a data structure representation of the robot; for each of at least a second number of poses of the robot, determining, by at least one set of circuitry, whether any portion of the robot will collide with any persistent obstacles in an environment in which the robot operates based at least in part on a data structure representation of a set of persistent obstacles in the environment, the data structure representation including a representation of a first number of obstacles for which a respective volume in the environment occupied by each of the obstacles of the first number of obstacles is known at a configuration time; for each of at least a third number of poses of the robot, determining, by at least one set of circuitry, whether any portion of the robot will collide with any transient obstacles in the environment based at least in part on a data structure representation of a set of transient obstacles in the environment, the data structure representation including a representation of a second number of obstacles in the environment, if any, for which, a respective volume in the environment occupied by each of the obstacles of the second number of obstacles is known during at least some portion of a run time and for which the respective volume in the environment occupied by each of the obstacles is not known at the configuration time; and providing a signal that represents whether or not a collision has been detected for at least one of the poses.

Determining whether any portion of the robot will collide with another portion of the robot based at least in part on a data structure representation of the robot may include determining whether at least one portion of a robotic appendage will collide with another portion of the robotic appendage in a first pose. Determining whether any portion of the robot will collide with another portion of the robot based at least in part on a data structure representation of the robot may include determining whether at least one portion of a robotic appendage will collide with another portion of the robotic appendage in moving between a first pose and a second pose. Determining whether any portion of the robot will collide with any persistent obstacles in the environment in which the robot operates based at least in part on a data structure representation of a set of persistent obstacles in the environment may include determining whether at least one portion of a robotic appendage will collide with any persistent obstacles in the environment in a first pose. Determining whether any portion of the robot will collide with any persistent obstacles in the environment in which the robot operates based at least in part on a data structure representation of a set of persistent obstacles in the environment may include determining whether at least one portion of a robotic appendage will collide with any persistent obstacles in the environment in moving between a first pose and a second pose. Determining whether any portion of the robot will collide with any transient obstacles in the environment in which the robot operates based at least in part on a data structure representation of a set of transient obstacles in the environment may include determining whether at least one portion of a robotic appendage will collide with any transient obstacles in the environment in a first pose. Determining whether any portion of the robot will collide with any transient obstacles in the environment in which the robot operates based at least in part on a data structure representation of a set of transient obstacles in the environment may include determining whether at least one portion of a robotic appendage will collide with any transient obstacles in the environment in moving between a first pose and a second pose.

The method may further include during the configuration time, for a robot represented by a kinematic model, generating the data structure representation of the robot; and for the environment, generating the data structure representation of the set of persistent obstacles in the environment, the data structure representation including the representation of the first number of obstacles for which a respective volume in the environment occupied by each of the obstacles of the first number of obstacles is known at a configuration time. Generating the data structure representation of the set of persistent obstacles in the environment may include generating a hierarchy of bounding volumes. Generating a hierarchy of bounding volumes may include generating a hierarchy of bounding boxes with triangle meshes as leaf nodes. Generating a hierarchy of bounding volumes may include generating a hierarchy of spheres. Generating a hierarchy of bounding volumes may include generating a k-ary sphere tree. Generating a hierarchy of bounding volumes may include generating a hierarchy of axis-aligned bounding boxes. Generating a hierarchy of bounding volumes may include generating a hierarchy of oriented bounding boxes. Generating the data structure representation of the set of persistent obstacles in the environment may include generating an octree that stores voxel occupancy information that represents the set of persistent obstacles in the environment. Generating the data structure representation of the robot may include generating a k-ary tree. Generating the data structure representation of the robot may include for each of a number of links of the robot, generating a respective k-ary tree. Generating the data structure representation of the robot may include for each of a number of links of the robot, generating a respective 8-ary tree. Generating the data structure representation of the robot may include for each of a number of links of the robot, generating a respective 8-ary tree with a tree depth equal to or greater than four. Generating the data structure representation of the robot may include for each of a number of links of the robot, generating a respective k-ary tree, where each node of the k-ary tree is a sphere that is identified as occupied if any portion of the respective sphere is occupied.

The method may further include during the run time, for the environment, generating the data structure representation of a set of transient obstacles in the environment, the data structure representation including the representation of the transient obstacles, if any, for which, a respective volume in the environment occupied by each of the obstacles of the second number of obstacles is known during at least some portion of the run time and for which the respective volume in the environment occupied by each of the obstacles is not known at the configuration time, and the determining whether any portion of the robot will collide with another portion of the robot, the determining whether any portion of the robot will collide with any persistent obstacles in an environment, and the determining whether any portion of the robot will collide with any transient obstacles in the environment all occur during the run time.

The method may further include receiving sensor information that represents the transient obstacles, if any, in the environment; and converting the sensor information into occupancy information, and generating the data structure representation of the set of transient obstacles in the environment may include generating the data structure representation of the set of transient obstacles in the environment from the occupancy information.

The method may further include receiving a kinematic model that represents the robot in the form of a robotic appendage with a number of links and a number of joints, the joints between respective pairs of the links; receiving occupancy information that represents respective locations of the set of persistent obstacles in the environment; and receiving at least one value that represents a motion subdivision granularity to be employed in motion planning.

The receiving the kinematic model, the receiving occupancy information, and the receiving at least one value that represents a motion subdivision granularity may all occur during the configuration time, and may further include generating the data structure representation of the robot during the configuration time based on the kinematic model of the robot; and generating the data structure representation of the set of persistent obstacles in the environment during the configuration time, the data structure representation including the representation of the first number of obstacles for which a respective volume in the environment occupied by each of the obstacles of the first number of obstacles is known at the configuration time.

The method may further include generating the data structure representation of a set of transient obstacles in the environment during the run time, the data structure representation including the representation of the transient obstacles, if any, for which, a respective volume in the environment occupied by each of the obstacles of the second number of obstacles is known during at least some portion of the run time and for which the respective volume in the environment occupied by each of the obstacles is not known at the configuration time.

The robot may include a robotic appendage and may further include for a motion of the robot appendage between a first pose of the robot appendage and a second pose of the robot appendage, computing a plurality of intermediate poses of the robot appendage, the plurality of intermediate poses between the first and the second poses of the robot appendage in a C-space of the robotic appendage, until a dimension between a number of pairs of successively adjacent poses in the C-space satisfies the received value for the motion subdivision granularity. Computing a plurality of intermediate poses of the robot appendage may include for each of the joints of the robotic appendage, interpolating between a respective position and orientation for the joint in the first and the second poses to obtain an nth intermediate pose; and for each of the joints of the robotic appendage iteratively interpolating between a respective position and orientation for the joint in a respective pair of nearest neighbor poses for a respective $i^{th}$ iteration until an end condition is reached.

The end condition may be a distance between successively adjacent poses that satisfies motion subdivision granularity to obtain an nth intermediate pose and may further include for a number of the iterations, determining whether the end condition has been reached.

The method may further include for each of a number of the poses, performing forward kinematics on the kinematic robot model to compute a number of transforms of each link of the robotic appendage, mapping poses or motions from C space to free space (e.g., three-dimensional environment).

Any one or more of: determining whether any portion of the robot will collide with another portion of the robot, determining whether any portion of the robot will collide with any persistent obstacles, or determining whether any portion of the robot will collide with any transient obstacles may be based on a hierarchical representation or a Euclidean Distance Field representation.

A system to generate collision assessments useful in motion planning for robotics may be summarized as including at least one processor; at least one non-transitory processor-readable medium that stores at least one of processor-executable instructions or data which, when executed by the at least one processor, causes the at least one processor to: for each of at least a first number of poses of a robot, determine whether any portion of the robot will collide with another portion of the robot based at least in part on a data structure representation of the robot; for each of at least a second number of poses of the robot, determine whether any portion of the robot will collide with any persistent obstacles in an environment in which the robot operates based at least in part on a data structure representation of a set of persistent obstacles in the environment, the data structure representation including a representation of a first number of obstacles for which a respective volume in the environment occupied by each of the obstacles of the first number of obstacles is known at a configuration time; for each of at least a third number of poses of the robot, determine whether any portion of the robot will collide with any transient obstacles in the environment based at least in part on a data structure representation of a set of transient obstacles in the environment, the data structure representation including a representation of a second number of obstacles in the environment, if any, for which, a respective volume in the environment occupied by each of the obstacles of the second number of obstacles is known during at least some portion of a run time and for which the respective volume in the environment occupied by each of the obstacles is not known at the configuration time; and provide a signal that represents whether or not a collision has been detected for at least one of the poses.

To determine whether any portion of the robot will collide with another portion of the robot based at least in part on a data structure representation of the robot the at least one processor may determine whether at least one portion of a robotic appendage will collide with another portion of the robotic appendage in a first pose. To determine whether any portion of the robot will collide with another portion of the robot based at least in part on a data structure representation of the robot the at least one processor may determine whether at least one portion of a robotic appendage will collide with another portion of the robotic appendage in moving between a first pose and a second pose. To determine whether any portion of the robot will collide with any persistent obstacles in the environment in which the robot operates based at least in part on a data structure representation of a set of persistent obstacles in the environment the at least one processor may determine whether at least one portion of a robotic appendage will collide with any persistent obstacles in the environment in a first pose. To determine whether any portion of the robot will collide with any persistent obstacles in the environment in which the robot operates based at least in part on a data structure representation of a set of persistent obstacles in the environment the at least one processor may determine whether at least one portion of a robotic appendage will collide with any persistent obstacles in the environment in moving between a first pose and a second pose. To determine whether any portion of the robot will collide with any transient obstacles in the environment in which the robot operates based at least in part on a data structure representation of a set of transient obstacles in the environment the at least one processor may determine whether at least one portion of a robotic appendage will collide with any transient obstacles in the environment in a first pose. To determine whether any portion of the robot will collide with any transient obstacles in the environment in which the robot operates based at least in part on a data structure representation of a set of transient obstacles in the environment the at least one processor may determine whether at least one portion of a robotic appendage will collide with any transient obstacles in the environment in moving between a first pose and a second pose.

Execution of the at least one of processor-executable instructions or data may further cause the at least processor to, during the configuration time, for a robot represented by a kinematic model, generate the data structure representation of the robot; and for the environment, generate the data structure representation of the set of persistent obstacles in the environment, the data structure representation including the representation of the first number of obstacles for which a respective volume in the environment occupied by each of the obstacles of the first number of obstacles is known at a configuration time. To generate the data structure representation of the set of persistent obstacles in the environment the at least one processor may generate a hierarchy of bounding volumes. To generate a hierarchy of bounding volumes the at least one processor may generate a hierarchy of bounding boxes with triangle meshes as leaf nodes. To generate a hierarchy of bounding volumes the at least one processor may generate a hierarchy of spheres. To generate a hierarchy of bounding volumes the at least one processor may generate a k-ary sphere tree. To generate a hierarchy of bounding volumes the at least one processor may generate a hierarchy of axis-aligned bounding boxes. To generate a hierarchy of bounding volumes the at least one processor may generate a hierarchy of oriented bounding boxes. To generate the data structure representation of the set of persistent obstacles in the environment the at least one processor may generate an octree that stores voxel occupancy information that represents the set of persistent obstacles in the environment. To generate the data structure representation of the robot the at least one processor may generate a k-ary tree. To generate the data structure representation of the robot the at least one processor may generate a respective k-ary tree for each of a number of links of the robot. To generate the data structure representation of the robot the at least one processor may generate a respective 8-ary tree for each of a number of links of the robot. To generate the data structure representation of the robot the at least one processor may generate a respective 8-ary tree with a tree depth equal to or greater than four for each of a number of links of the robot. To generate the data structure representation of the robot the at least one processor may generate a respective k-ary tree for each of a number of links of the robot, where each node of the k-ary tree is a sphere that is identified as occupied if any portion of the respective sphere is occupied.

Execution of the at least one of processor-executable instructions or data may further cause the at least processor to, during the run time, for the environment, generate the data structure representation of a set of transient obstacles in the environment, the data structure representation including the representation of the transient obstacles, if any, for which, a respective volume in the environment occupied by each of the obstacles of the second number of obstacles is known during at least some portion of the run time and for which the respective volume in the environment occupied by each of the obstacles is not known at the configuration time, and the determination of whether any portion of the robot will collide with another portion of the robot, the determination of whether any portion of the robot will collide with any persistent obstacles in an environment, and the determination of whether any portion of the robot will collide with any transient obstacles in the environment all occur during the run time.

Execution of the at least one of processor-executable instructions or data may further cause the at least one processor to receive sensor information that represents the transient obstacles, if any, in the environment; and convert the sensor information into occupancy information, and to generate the data structure representation of the set of transient obstacles in the environment the at least one processor may generate the data structure representation of the set of transient obstacles in the environment from the occupancy information.

Execution of the at least one of processor-executable instructions or data may further cause the at least processor to receive a kinematic model that represents the robot in the form of a robotic appendage with a number of links and a number of joints, the joints between respective pairs of the links; receive occupancy information that represents respective locations of the set of persistent obstacles in the environment; and receive at least one value that represents a motion subdivision granularity to be employed in motion planning.

The kinematic model, the occupancy information, and the at least one value that represents a motion subdivision granularity may all be received during the configuration time, and execution of the at least one of processor-executable instructions or data may further cause the at least processor to generate the data structure representation of the robot during the configuration time based on the kinematic model of the robot; and generate the data structure representation of the set of persistent obstacles in the environment during the configuration time, the data structure representation including the representation of the first number of obstacles for which a respective volume in the environment occupied by each of the obstacles of the first number of obstacles is known at a configuration time.

Execution of the at least one of processor-executable instructions or data may further cause the at least processor to generate the data structure representation of a set of transient obstacles in the environment during the run time, the data structure representation including the representation of the transient obstacles, if any, for which, a respective volume in the environment occupied by each of the obstacles of the second number of obstacles is known during at least some portion of the run time and for which the respective volume in the environment occupied by each of the obstacles is not known at the configuration time.

The robot may include a robotic appendage, and execution of the at least one of processor-executable instructions or data may further cause the at least processor to, for a motion of the robot appendage between a first pose of the robot appendage and a second pose of the robot appendage, compute a plurality of intermediate poses of the robot appendage, the plurality of intermediate poses between the first and the second poses of the robot appendage in a C-space of the robotic appendage, until a dimension between a number of pairs of successively adjacent poses in the C-space satisfies the received value for the motion subdivision granularity. To compute a plurality of intermediate poses of the robot appendage the at least one processor, for each of the joints of the robotic appendage, may interpolate between a respective position and orientation for the joint in the first and the second poses to obtain an nth intermediate pose; and for each of the joints of the robotic appendage iteratively may interpolate between a respective position and orientation for the joint in a respective pair of nearest neighbor poses for a respective $i^{th}$ iteration until an end condition is reached.

The end condition may be a distance between successively adjacent poses that satisfies motion subdivision granularity to obtain an nth intermediate pose, and execution of the at least one of processor-executable instructions or data may further cause the at least processor to, for a number of the iterations, determine whether the end condition has been reached.

Execution of the at least one of processor-executable instructions or data may further cause the at least processor to, for each of a number of the poses, perform forward kinematics on the kinematic robot model to compute a number of transforms of each link of the robotic appendage between C space and free space.

Any one or more of the determinations of i) whether any portion of the robot will collide with another portion of the robot, ii) whether any portion of the robot will collide with any persistent obstacles, or iii) whether any portion of the robot will collide with any transient obstacles may be based on a hierarchical representation or a Euclidean Distance Field representation.

The at least one of processor-executable instructions or data, when executed by the at least one processor, may further cause the at least one processor to perform any of the methods described herein.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, actuator systems, and/or communications networks have not been shown or described in detail to avoid unnecessarily obscuring descriptions of the embodiments. In other instances, well-known computer vision methods and techniques for generating perception data and volumetric representations of one or more objects and the like have not been described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one implementation" or "an implementation" or to "one embodiment" or "an embodiment" means that a particular feature, structure or characteristic described in connection with the embodiment is included in at least one implementation or in at least one implementation embodiment. Thus, the appearances of the phrases "one implementation" or "an implementation" or "in one embodiment" or "in an embodiment" in various places throughout this specification are not necessarily all referring to the same implementation or embodiment. Furthermore, the particular features, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in this specification and the appended claims, the terms determine, determining and determined when used in the context of whether a collision will occur or result, mean that an assessment or prediction is made as to whether a given pose or movement between two poses via a number of intermediate poses will result in a collision between a portion of a robot and some object (e.g., another portion of the robot, a persistent obstacle, a transient obstacle, or some object then a currently targeted object).

The headings and Abstract of the Disclosure provided herein are for convenience only and do not interpret the scope or meaning of the embodiments.

Figure 1:
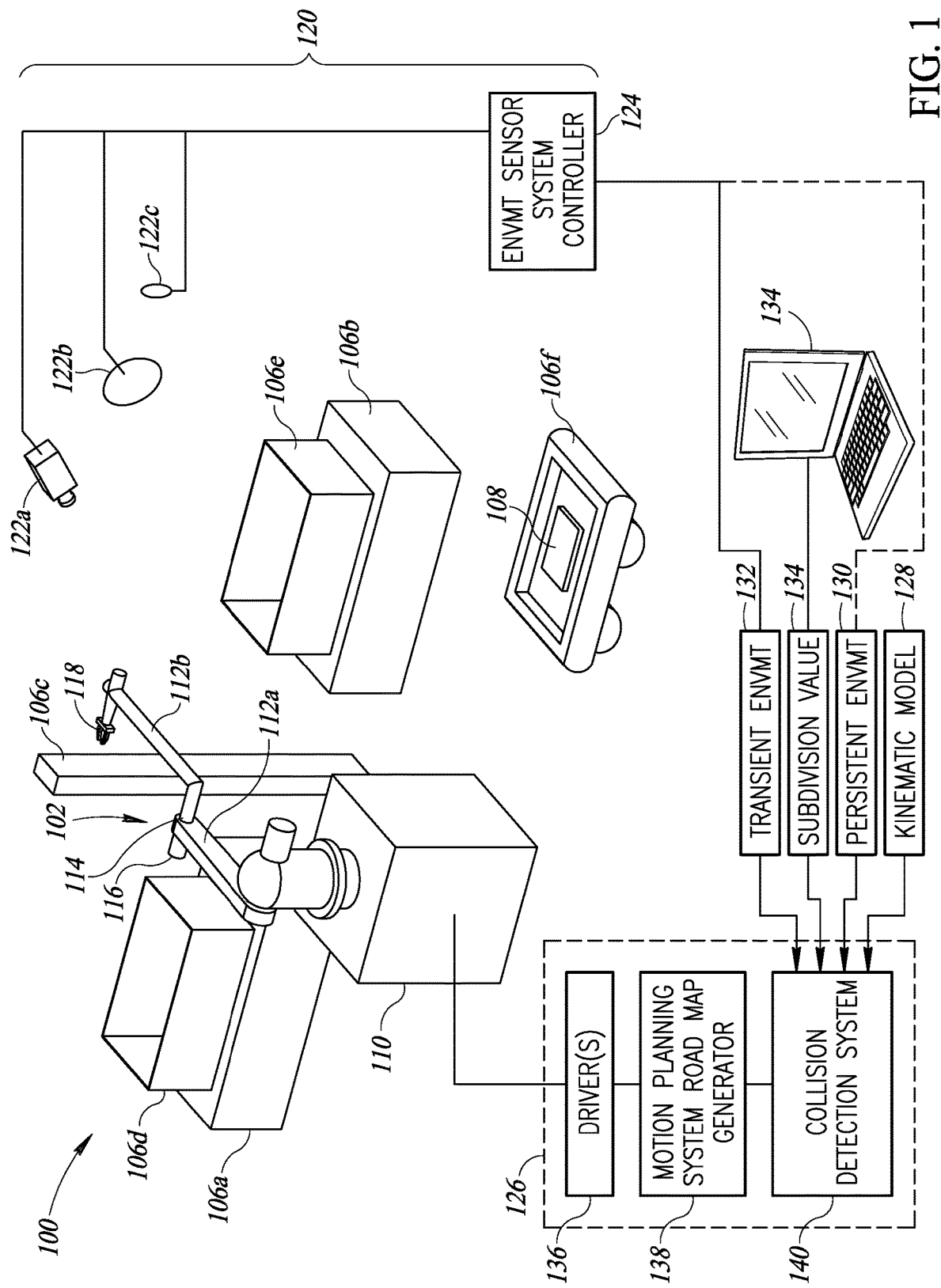
FIG. 1 is a schematic view of a robot, robot control system including drivers, motion planning system, and collision detection system, and other components, the robot in an environment in which the robot may operate, the environment which includes a number of obstacles some of which are persistent and others which are transitory, and optionally a number of target objects, according to one illustrated implementation.

FIG. 1 shows an operational environment 100 in which a robot 102 may operate, according to one illustrated embodiment. For the sake of brevity, the operational environment 100 is referred to herein as the environment 100. The environment 100 represents a two-dimensional or three-dimensional space in which the robot 102 may operate and move. It is noted that the environment 100 is different than a "configuration space" or "C-space" of a robot, which is described below with reference to FIG. 4.

The environment 100 can include obstacles 106a-106n (collectively 106) that represent regions of possible collision. The terms obstacle and obstacles 106 are used to indicate an object (e.g., inanimate objects, animate objects including people and other animals) which represents a risk of collision.

Some of these obstacles 106a, 106b, 106c may take the form of static obstacles or objects (i.e., obstacles or objects that do not move (i.e., translate, rotate) or change shape during a relevant period or run time, e.g., buildings, trees, rocks, furniture, pedestals 106a, 106b, support posts 106c, shelves). Some of these obstacles may take the form of dynamic obstacles or objects 106d, 106e, 106f (i.e., obstacles or objects that move (i.e., translate, rotate) or change shape during at least a portion of a relevant period or run time, e.g., other robots, containers 106d, 106e, vehicles or robots in the form of vehicles 106f, people, animals, rolling or shifting items 106g) in the environment 100. For example, a set of pedestals 106a, 106b and a support post 106c may be fixed or may not move or change shape over a relevant period of time (e.g., the run time), and hence are considered static obstacles 106. Also for example, a set of containers 106d, 106e and another robot for instance in the form of a vehicle (e.g., wheeled self-propelled autonomously driven trolley) 106f may move or change shape (e.g., tilt) during a relevant period of time (e.g., the run time), and hence are considered dynamic obstacles 106.

For some of the obstacles 106a-106c, a respective volume occupied by the obstacles is known at a time at which a model or computational circuitry is configured, a time denominated as configuration time, and is expected to remain fixed or unchanged through robot operation, a time denominated as run time. These obstacles 106a-106c are denominated as persistent obstacles since a volume the obstacle(s) occupies is known during configuration time and is expected to stay fixed or unchanged through run time. For other obstacles 106d-106f, a respective volume the obstacle(s) occupy is not known at the configuration time, and is only determined at run time. These obstacles 106d-106f are denominated as transient obstacles since a volume the obstacle(s) occupy is not known during configuration time.

The environment 100 may optionally include one or more target objects 108 with which the robot 102 is intended to interact, for example by grasping the target object 108, moving the target object 108, otherwise engaging the target object 108 to perform some defined task or operation. The target object 108 is typically not considered an obstacle, but in some implementations could constitute an obstacle, for example where there are a plurality of target objects 108 which the robot will engage sequentially. Some implementations may not include any target object, the robot 102 being moved between various poses without interacting with or engaging any objects.

FIG. 1 illustrates a representative environment 100 with a limited number of obstacles 106 and target objects 108. Typical environments may include many additional obstacles 106 and target objects 108, including objects that correspond to other robots and various other natural or artificial static and dynamic obstacles 106 or target objects 108. Some environments may completely omit target objects 108, or even omit dynamic obstacles 106. The concepts taught herein may be employed in a similar fashion with a more populated environment than that illustrated.

The robot 102 may be any type of robot, including, but not limited to: Cartesian, selectively compliant arm for robotic assembly (SCARA), cylindrical, delta, polar and vertically articulated. The robot may also be an automobile, airplane, drone, or any other vehicle that can operate autonomously or semi-autonomously (i.e., at least partially autonomously) and move in the space represented by the environment 100. In the illustrated implementation, the robot 102 includes a base 110, a set of links 112a, 112b (only two called out, collectively 112), and a set of joints 114 (only one called out), each of the joints 114 physically coupling a respective pair of the links 112. The robot 102 can also include one or more actuators (e.g., electric motor, stepper motor, solenoid, electromagnet, hydraulic piston, pneumatic piston, hydraulic valve, pneumatic valve, pumps or compressors for vacuum systems, hydraulic systems, pneumatic systems) 116 (only one called out) that drive movement of one link 112a relative to another link 112b, or relative to the base 110. The robot 102 may also include an end effector or end of arm tool 118, for example a grasper with opposable digits, hook, or vacuum port to physically engage target objects 108 in the environment 100.

The environment 100 may include an environmental sensor system 120 which may comprise one or more environmental sensors 122a, 122b, 122c (three shown, collectively 122) and a hub or environmental sensor system controller 124.

The environmental sensors 122 can take any of a large variety of forms or types, for example one or more digital cameras 122a, one or more motion sensors or radars 122b, one or more microphones 122c, one or more weight sensors or load cells (not shown), one or more electric eyes (e.g., IR light source and IR sensor) (not shown), one or more encoders (e.g., positon encoder, rotary encoder, Reed switch) (not shown), one or more temperature sensors (not shown), humidity sensors (not shown), and/or one or more pressure sensors (not shown), to name a few. The sensors detect characteristics of the environment including characteristics (e.g., position, orientation, shape, occupancy, movement, velocity) of the obstacles, target objects, the robot, and/or other objects in the environment. The sensors 122 can provide signals, wired, optically, wirelessly, to the hub or environmental sensor system controller 124. At least some of those signals may optionally encode or otherwise represent perception data.

The hub or environmental sensor system controller 124 may include circuitry, for example one or more processors and/or one or more non-transitory processor-readable media (e.g., nonvolatile memory, volatile memory, spinning storage media), and may execute one or more sets of processor-executable instructions, for example stored by the non-transitory processor-readable media. The hub or environmental sensor system controller 124 may be communicatively coupled (e.g., wired, optically, wirelessly) to one or more of the sensors 122 to receive sensed information, for instance perception data. In some implementations, execution of the processor-executable instructions by one or more processors may cause the hub or environmental sensor system controller 124 to process or pre-process some or all of the received sensed information.

A robot control system 126 may be communicatively coupled (e.g., wired, optically, wirelessly) to the hub or environmental sensor system controller 124 to receive information therefrom. Information may include a representation of transient obstacles 132 in the environment 100. The robot control system 126 may be communicatively coupled (e.g., wired, optically, wirelessly) to a computer or terminal 134 to receive an indication of a motion subdivision granularity value or specification 136.

The robot control system 126 may include several components, which typically are distinct, but in some implementations may be combined in a common circuit board, processor or other circuitry. For example, a set of drivers 136 may include circuitry to communicatively coupled to actuator(s) 116 to drive the actuators to cause the robot 102 to adopt or move to defined poses. Drivers can, for example, include motor controllers and similar circuitry that drive any one or more of electric motors, stepper motors, solenoids, electromagnets, hydraulic pistons, pneumatic pistons, hydraulic valves, pneumatic valves, pumps or compressors for vacuum systems, hydraulic systems, pneumatic systems.

The robot control system 126 may include a motion planning system 138. The motion planning system 138 may be an integral part of the robot 102, separate and distinct from the robot 102, or one or more portions may be onboard the robot while one or more other portions may be separate from (i.e., offboard) the robot. The motion planning system 138 may include circuitry, for example one or more processors and/or one or more non-transitory processor-readable media (e.g., nonvolatile memory, volatile memory, spinning storage media), and may execute one or more sets of processor-executable instructions, for example stored by the non-transitory processor-readable media. The motion planning system 138 may generate motion plans for causing the robot 102 to carry out a particular task, for example moving between a series of sequential poses, preferably without collisions with obstacles 106. The motion planning system 138 may be communicatively coupled (e.g., wired, optically, wirelessly) to the driver(s) 136 to provide instructions thereto that cause the robot to follow or execute the motion plan.

The robot control system 126 may include, or access, a collision detection system 140. The collision detection system 140 may include circuitry, for example one or more processors and/or one or more non-transitory processor-readable media (e.g., nonvolatile memory, volatile memory, spinning storage media), and may execute one or more sets of processor-executable instructions, for example stored by the non-transitory processor-readable media. As illustrated and described in detail elsewhere herein, the collision detection system 140 advantageously employs data structure representations of the kinematic model of the robot, the persistent obstacles in the environment and the transient obstacles in the environment to determine or detect collisions of the robot with obstacles 106 in the environment 100 in various poses or in moving between poses. The data structures may advantageously take the form of hierarchical data structures (e.g., octrees, sets of volumes or boxes (e.g., a tree of axis-aligned bounding boxes (AABBs), a tree of oriented (not axis-aligned) bounding boxes, or a tree of spheres), other tree structures) or non-hierarchical data structures (e.g., Euclidean Distance Field). As explained herein, the collision detection system 140 may employ the motion subdivision granularity value or specification 136 in determining or detecting collisions.

The collision detection system 140 may be communicatively coupled (e.g., wired, optically, wirelessly) to the hub or environmental sensor system controller 124 to receive the representation of a kinematic model 128 of the robot 102, a representation of the persistent obstacles 130 in the environment 100, and a representation of transient obstacles 132 in the environment 100. In at least some implementations, the collision detection system 140 receives one, more or all of the kinematic model 128, the representation of the persistent obstacles 130, and/or the representation of transient obstacles 132 in a non-hierarchical format. In those implementations, the collision detection system 140 may in some instances advantageously transform one, more or all of the kinematic model 128, the representation of the persistent obstacles 130, and/or the representation of transient obstacles 132 into hierarchical formats or hierarchical data structures. In some implementations, the collision detection system 140 may in some instances advantageously transform one, more or all of the kinematic model 128, the representation of the persistent obstacles 130, and/or the representation of transient obstacles 132 into a non-hierarchical format or hierarchical data structure, for instance a Euclidean Distance Field representation. In other implementations, the collision detection system 140 receives one, more or all of the kinematic model 128, the representation of the persistent obstacles 130, and/or the representation of transient obstacles 132 in hierarchical formats and does not perform any transformation. In yet other implementations, the collision detection system 140 receives one, more or all of the kinematic model 128, the representation of the persistent obstacles 130, and/or the representation of transient obstacles 132 in non-hierarchical formats and does not perform any transformation. In still further implementations, the collision detection system 140 receives one, more or all of the kinematic model 128, the representation of the persistent obstacles 130, and/or the representation of transient obstacles 132 in hierarchical formats and transforms such to a non-hierarchical format (e.g., EDF).

The collision detection system 140 may be communicatively coupled (e.g., wired, optically, wirelessly) to the computer or terminal 134 to receive the motion subdivision granularity value or specification 136. Alternatively, the motion subdivision granularity value or specification 136 may be previously stored by the collision detection system 140 or received from some other source.

In the illustrated implementation, a target object 108 is transported through a portion of the environment 100 via a vehicle 106f, for example an autonomous self-propelled wheeled or tracked robotic vehicle or trolley (e.g., KIVA® robot). It is noted that other vehicles can be employed including airborne vehicles (e.g., rotary aircraft or quadcopters, airborne drones) and/or waterborne vehicles (e.g., ships, submersibles, waterborne drones). The robot 102 may be tasked with retrieving the target object 108 from the vehicle 106f and depositing the target object 108 into a selected one of the containers 106d, 106e without colliding with any of the obstacles 106a-106f in the environment. Alternatively, the robot 102 may be tasked with retrieving the target object 108 from a selected one of the containers 106d, 106e and depositing the target object 108 onto the vehicle 106f without colliding with any of the obstacles 106a-106f in the environment. Executing the task employs motion planning, which in turn employs collision detection.

Challenges to motion planning involve the ability to perform motion planning at a relatively low cost, but at very fast speeds and frequently as characteristics of the environment or even the robot change. For example, obstacles may enter the environment after configuration, or may move (e.g., translate, rotate) in the environment or change shape after configuration or even during operation or movement of the robot 102 during run time. Also for example, such characteristics may include, but are not limited to, a volume considered occupied by a portion (e.g., end of arm tool or end effector 108) of the robot 102 when the robot 102 is holding target objects 108 of various sizes, when changing to a different end effector 118 or when changing to a different robotic appendage. Thus, it is advantageous for the motion planning to account for those changes in order to perform a task. Involved with this are challenges to efficiently represent, communicate and compare the space considered to be occupied by the obstacles 106 and even the robot 102 in the environment 100. Therefore, the present disclosure provides techniques that facilitate motion planning, and particularly collision detection, which enable robots 102 to successfully carry out tasks in real world environments.

Figure 2:
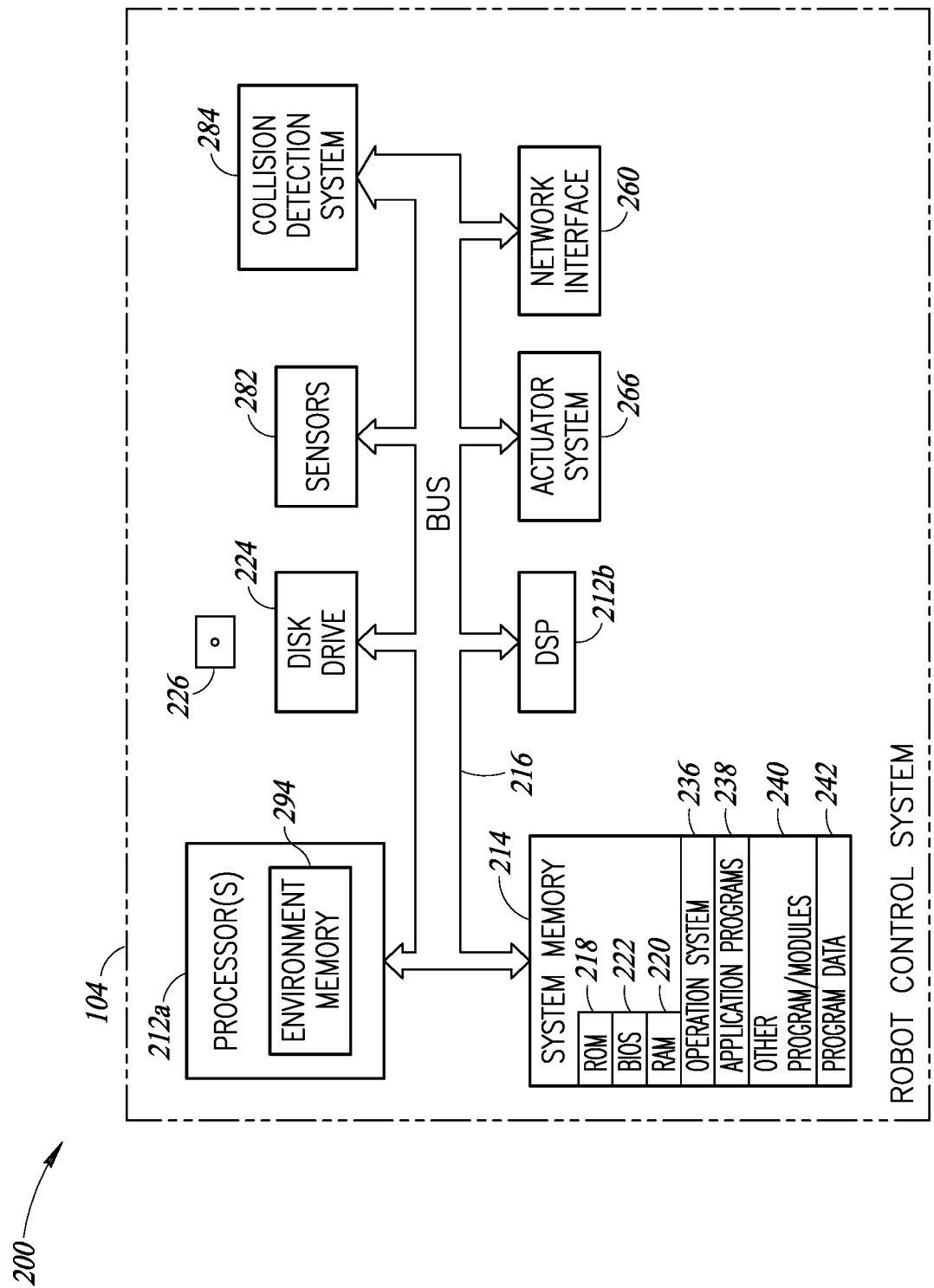
FIG. 2 is a functional block diagram of a robot control system of FIG. 1, according to one illustrated implementation.

FIG. 2 and the following discussion provide a brief, general description of a suitable robot control system 200 in which various illustrated and described motion planning systems and methods might be implemented, according to one illustrated implementation.

Although not required, many of the implementations will be described in the general context of computer-executable instructions, such as program application modules, objects, or macros stored on computer- or processor-readable media and executed by one or more computer or processors that can perform collision assessments and motion planning operations. Such motion planning operations may include, but are not limited to, generating or transforming one, more or all of: the representation of the robot geometry based on the kinematic model 128 (FIG. 1), the representation of the persistent obstacles 130 (FIG. 1), and/or the representation of transient obstacles 132 (FIG. 1) into data structure formats (e.g., hierarchical formats, non-hierarchical formats). Such motion planning operations may include, but are not limited to, determining or detecting or predicting collisions for various poses of the robot or motions of the robot between poses using a data structure representation of the robot, a data structure representation of persistent obstacles, if any, in the environment, and/or a data structure representation of transient obstacles, if any, in the environment. Such may optionally be based on a motion subdivision granularity value or specification 134. In some implementations, motion planning operations may include, but are not limited to, determining one or more planning graphs, motion plans or road maps; storing the determined planning graph(s), motion plan(s) or road map(s), and/or providing the planning graph(s), motion plan(s) or road map(s) to control operation of a robot.

As previously discussed, a number of sensors 282, may provide perception data and/or other sensed information to one or more processors, such as processor 212a. The perception data may be provided as a stream that represents which voxels or sub-volumes (e.g., boxes) are occupied in the environment at a current time, e.g., pre-configuration time, configuration time, run time). This data may be provided to one or more processors, such a processor 212a, in the form of an occupancy grid. In particular, when representing either a robot or an object in the environment 100 (e.g., an obstacle 106, target object 108), one may represent their surfaces as either voxels (3D pixels) or meshes of polygons (often triangles). Each discretized region of space is termed a "voxel," equivalent to a 3D (volumetric) pixel. In some cases, it is advantageous to represent the objects instead as boxes (rectangular prisms). Due to the fact that objects are not randomly shaped, there may be a significant amount of structure in how the voxels are organized; many voxels in an object are immediately next to each other in 3D space. Thus, representing objects as boxes may require far fewer bits (i.e., may require just the x, y, z Cartesian coordinates for two opposite corners of the box). Also, doing intersection tests for boxes is comparable in complexity to doing so for voxels.

At least some implementations may combine the outputs of multiple sensors and the sensors may provide a very fine granularity voxelization. However, in order for the robot 102 to efficiently perform motion planning, the processor 212a of the robot 102 may use coarser voxels (i.e., "processor voxels") to represent the environment and the volume in 3D space swept by the robot 102 when making transitions between various poses or states. Thus, the system 200 may transform the output of the sensors 282 accordingly. For example, the output of the sensors 282 may use 10 bits of precision on each axis, so each voxel originating directly from the sensors 282 (i.e., a "sensor voxel") has a 30-bit ID, and there are $2^{30}$ sensor voxels. The system 200 may use (at configuration time and runtime) 6 bits of precision on each axis for an 18-bit processor voxel ID, and there would be $2^{18}$ processor voxels. Thus there could, for example, be $2^{12}$ sensor voxels per processor voxel. At runtime, if the system 200 determines any of the sensor voxels within a processor voxel is occupied, the system 200 considers the processor voxel to be occupied and generates the occupancy grid accordingly.

In one implementation, collision assessment is performed in response to a function call or similar process by the motion playing system 138, and returns a Boolean value thereto. The collision detection system may advantageously be implemented via one or more field programmable gate arrays (FPGAs) and/or one or more application specific integrated circuits (ASICs) to perform the collision detection while achieving low latency, relatively low power consumption, lower cost (e.g., as compared to use of dynamic random access memory (DRAM)), and increasing an amount of information that can be handled.

In various embodiments, such operations may be performed entirely in hardware circuitry or as software stored in a memory storage, such as system memory 214, and executed by one or more hardware processors 212a, such as one or more microprocessors, digital signal processors (DSPs), field programmable gate arrays (FPGAs), application specific integrated circuits (ASICs), graphics processing units (GPUs) processors, programmed logic controllers (PLCs), electrically programmable read only memories (EEPROMs), or as a combination of hardware circuitry and software stored in the memory storage.

Also, implementation of various aspects of perception, planning graph construction, collision detection, and path search are also described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," International Patent Application Publication No. WO 2016/122840, filed Jan. 5, 2016, entitled "SPECIALIZED ROBOT MOTION PLANNING HARDWARE AND METHODS OF MAKING AND USING SAME" and U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS". Those skilled in the relevant art will appreciate that the illustrated implementations, as well as other implementations, can be practiced with other system structures and arrangements and/or other computing system structures and arrangements, including those of robots, hand-held devices, multiprocessor systems, microprocessor-based or programmable consumer electronics, personal computers ("PCs"), networked PCs, mini computers, mainframe computers, and the like. The implementations or embodiments or portions thereof (e.g., at configuration time and runtime) can be practiced in distributed computing environments where tasks or modules are performed by remote processing devices, which are linked through a communications network. In a distributed computing environment, program modules may be located in both local and remote memory storage devices or media. However, where and how certain types of information are stored is important to help improve motion planning.

For example, various motion planning solutions "bake in" a roadmap (i.e., a planning graph) into the processor, and each edge in the roadmap corresponds to a non-reconfigurable Boolean circuit of the processor. The design in which the planning graph is "baked in" to the processor, poses a problem of having limited processor circuitry to store multiple or large planning graphs and is generally not reconfigurable for use with different robots.

One solution provides a reconfigurable design that places the planning graph information into memory storage. This approach stores information in memory instead of being baked into a circuit. Another approach employed templated reconfigurable circuits in lieu of memory.

As noted above, some of the information may be captured, received, input or provided during a configuration time, that is before run time. During the run time, the sensors 282 send perception data to processor 212a. The perception data may be a stream of which voxels or boxes that are present in the current environment and are stored in on-chip environment memory 294. Collision detection may then be performed for the entire environment, including determining for any pose or movement between poses whether any portion of the robot will collide or is predicted to collide with another portion of the robot, with persistent obstacles in the environment or with transient obstacles in the environment. The collision detection advantageously uses data structure representations to perform the collision detection analysis, and typically returns a simple Boolean value as an output.

FIG. 2 shows a robot control system 200, such as that for robot 102, comprising one or more processor(s), represented by processor 212a, and one or more associated nontransitory machine-readable storage media, such as system memory 214, collision detection system 284 and computer-readable media 226 associated with disk drive 224. The associated nontransitory computer- or processor-readable storage media, including system memory 214, memory or registers of the collision detection system 284 and computer-readable media 226 associated with disk drive 224, are communicatively coupled to the processor 212a via one or more communications channels, such as system bus 216. The system bus 216 can employ any known bus structures or architectures, including a memory bus with memory controller, a peripheral bus, and/or a local bus. One or more sensors 282 and an actuator system 266 are also communicatively coupled to the processor 212a via system bus 216. One or more of such components may also or instead be in communication with each other via one or more other communications channels, for example, one or more parallel cables, serial cables, or wireless network channels capable of high speed communications, for instance, Universal Serial Bus ("USB") 3.0, Peripheral Component Interconnect Express (PCIe) or via Thunderbolt®.

The robot control system 200 may also be communicably coupled to remote systems, e.g., desktop computer, laptop computer, ultraportable computer, tablet computer, smartphone, wearable computer, collectively 134 (FIG. 1), that are directly communicably coupled or indirectly communicably coupled to the various components of the robot control system 200 via the network interface 260. Such remote systems may be used to program, configure, control or otherwise interface with or input data to the robot control system 200 and various components within the robot control system 200. Such a connection may be through one or more communications channels, for example, one or more wide area networks (WANs), for instance, the Internet, using Internet protocols. As noted above, pre-runtime calculations (e.g., generation of the family of planning graphs) may be performed by a system that is separate from the robot 102 or other robot, while runtime calculations may be performed on the processor 212 that is on the robot 102.

The construction and operation of the various blocks shown in FIG. 2 are described in International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS"; International Patent Application Publication No. WO 2016/122840, filed Jan. 5, 2016, entitled "SPECIALIZED ROBOT MOTION PLANNING HARDWARE AND METHODS OF MAKING AND USING SAME"; and/or U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS". As a result, such blocks need not be described in further detail, as they will be understood by those skilled in the relevant art in view of the references incorporated by reference herein.

The robot control system 200 may include one or more processing units 212, the system memory 214, the collision detection system 284 and the system bus 216 that couples various system components. In some implementations, the collision detection system 284 may take the form of one or more distinct processors, for example one or more FPGAs or ASICs. The processors 212a may be any logic processing unit, such as one or more central processing units (CPUs) 212a, digital signal processors (DSPs) 212b, application-specific integrated circuits (ASICs), field programmable gate arrays (FPGAs), etc. The system memory 214 may include read-only memory ("ROM") 218 and random access memory ("RAM") 220. A basic input/output system ("BIOS") 222, which can form part of the ROM 218, contains basic routines that help transfer information between elements within the robot control system 200, such as during start-up.

The robot control system 200 may include a disk drive 224, which may be, for example, a hard disk drive for reading from and writing to a hard disk, a flash memory drive for reading from and writing to removable flash memory devices, an optical disk drive for reading from and writing to removable optical disks, or a magnetic disk drive for reading from and writing to magnetic disks. The robot control system 200 may also include any combination of such disk drives in various different embodiments. The disk drive 224 may communicate with the processing units 212 via the system bus 216. The disk drive 224 may include interfaces or controllers (not shown) coupled between such drives and the system bus 216, as is known by those skilled in the relevant art. The disk drive 224 and its associated computer-readable media 226 provide nonvolatile storage of computer-readable instructions, data structures, program modules and other data for the robot control system 200. Those skilled in the relevant art will appreciate that other types of computer-readable media that can store data accessible by a computer may be employed, such as WORM drives, RAID drives, magnetic cassettes, digital video disks ("DVD"), Bernoulli cartridges, RAMs, ROMs, smart cards, etc.

Program modules can be stored in the system memory 214, such as an operating system 236, one or more application programs 238, other programs or modules 240 and program data 242. Application programs 238 may include instructions that cause the processor(s) 212 to perform one or more of: generating discretized representations of the environment 100 in which the robot will operate, including obstacles 106 and/or target objects 108 in the environment 100; generating planning graphs, motion plans or road maps including calling for or otherwise obtaining results of a collision assessment; and/or storing the determined plurality of planning graphs, motion plans, or road maps. Application programs 238 may additionally include one or more machine-readable instruction sets that cause the processor(s) 212 to perform other operations of perception (via sensors 282), planning graph construction, collision detection, and path search as described herein and in the references incorporated herein by reference.

The term "environment" is used in the present example to refer to the robot's current workspace, including obstacles. The term "task" is used in the present example to refer to a robot task in which the robot 102 must get from Pose A to Pose B (perhaps grasping or un-grasping or dropping an item or retrieving or placing an item) without colliding with obstacles in its environment. The term "scenario" is used in the present example to refer to a class of environment/task pairs. For example, a scenario could be "pick-and-place tasks in an environment with a 3-foot table and between x and y obstacles with sizes and shapes in a given range." There may be many different task/environment pairs that fit into such criteria, depending on the locations of goals and the sizes and shapes of obstacles. The system 200 may include one or more remote processing devices, which are linked through a communications network via network interface 260. Such one or more remote processing devices may execute one or more machine-readable instruction sets that cause the system 200 to generate a respective discretization of a representation of an environment 100 in which the robot 102 will operate for pairs of tasks and environments of various different scenarios. In an example embodiment, at least two of the respective discretizations comprise a respective set of voxels. The voxels of the respective discretizations may be non-homogenous in at least one of size and shape within the respective discretization. Also, a respective distribution of the non-homogeneousness of the voxels of the respective discretizations may be different from one another. In particular, the discretizations may comprise a respective set of voxels, where the voxels of at least two of the respective discretizations are non-homogenous in at least one of size and shape within the respective discretization, and a respective distribution of the non-homogeneousness of the voxels of at least two of the respective discretizations is different from one another. The application programs 238 may include one or more machine-readable instruction sets that cause the processor(s) 212 to then assess an effectiveness of the generated respective discretizations of the representation of the environment 100 in which the robot will operate and store the generated respective discretizations that are assessed to be the most effective for particular scenarios.

Application programs 238 may additionally include one or more machine-readable instruction sets that cause the collision detection system 284 to perform collision checking for any obstacles in an environment in which the robot will operate. The collision detection system 284 may perform such collision detection using various structure and techniques described elsewhere herein.

Application programs 238 may additionally include one or more machine-readable instruction sets that cause the processor(s) 212 to perform various other methods described herein, including, but not limited to, those illustrated in FIGS. 5 through 13.

In various embodiments, one or more of the operations described above may be performed by one or more remote processing devices of the system 200, which are linked through a communications network via network interface 260 or by one or more processor(s) 212 or collision detection system 284.

While shown in FIG. 2 as being stored in the system memory 214, the operating system 236, application programs 238, other programs/modules 240, and program data 242 can be stored on associated computer-readable media 226 of the disk drive 224.

The processor(s) 212 and collision detection system 284 may be any logic processing units, such as one or more central processing units (CPUs), digital signal processors (DSPs), application-specific integrated circuits (ASICs), field programmable gate arrays (FPGAs), etc. Non-limiting examples of commercially available computer systems include, but are not limited to, the Celeron, Core, Core 2, Itanium, and Xeon families of microprocessors offered by Intel® Corporation, U.S.A.; the K8, K10, Bulldozer, and Bobcat series microprocessors offered by Advanced Micro Devices, U.S.A.; the A5, A6, and A7 series microprocessors offered by Apple Computer, U.S.A.; the Snapdragon series microprocessors offered by Qualcomm, Inc., U.S.A.; and the SPARC series microprocessors offered by Oracle Corp., U.S.A.

Figure 3:
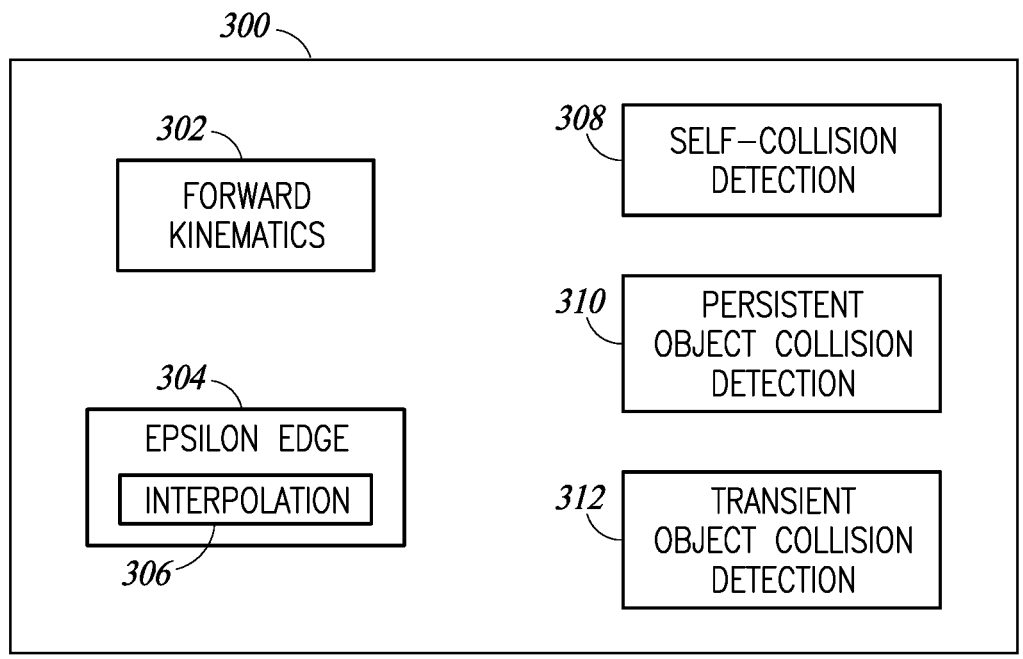
FIG. 3 is a functional block diagram of the collision detection system of FIG. 1, according to one illustrated implementation.

FIG. 3 shows a logic representation of various hardware modules or units of a collision detection system 300 that can be used in performing collision detection in accordance with the various methods or processes described herein.

A forward kinematics module or hardware unit 302 takes a pose (a D-tuple in configuration space or C space) as input, and provides as output a corresponding translation and rotation of each link of the robot in free space.

An epsilon edge module or hardware unit 304 receives two poses as input, and performs a recursive subdivision between these two poses to find or compute a number (e.g., plurality) of intermediate poses between previous pairs of poses. The subdivision and generation of intermediate poses continues until a distance between adjacent poses is less than a defined epsilon tolerance value. Use of the epsilon edge module or unit may be optional, for example where motion between two poses will not be assessed.

An interpolation module or hardware unit 306 receives two poses as input, and computes a new pose between the two poses. The interpolation module or unit 306 may be part of the epsilon edge module or hardware unit 304.

A robot self-collision detection module or hardware unit 308 detects collisions between different links in a robot, noting that no collision is possible between adjacent links. This hardware may advantageously be optimized to determine whether two sphere trees that represent respective ones of two links of the robot overlap.

A persistent environment collision detection module or hardware unit 310 detects collisions between any portion of a robot and persistent objects or obstacles in the environment in which the robot operates. This hardware may advantageously be optimized to determine whether a sphere tree that represents a link of a robot collides with a Euclidean distance field that represents the persistent object(s) in the environment.

A transient environment collision detection module or hardware unit 312 detects collisions between any portion of a robot and transient objects or obstacles in the environment in which the robot operates. This hardware may advantageously be optimized to determine whether a sphere tree that represents a link of a robot overlaps with a set of axis-aligned bounding boxes that represent the persistent object(s) in the environment.

Any one, or preferably all of the collision detection modules or hardware units 308, 310, 312 can employ fixed point hardware (i.e., circuitry), which may increase computational efficiency and power efficiency. While illustrated as one set of modules or units, an operational system may comprise multiple copies or instances of each of the aforesaid modules or hardware units, which may advantageously operate in parallel. For example, as soon as an interpolation unit produces a new pose, that pose can be checked for self-collisions and collisions with both persistent and transient objects, in parallel. Furthermore, collision checks can advantageously be parallelized across many collision detection units.

Figure 4:
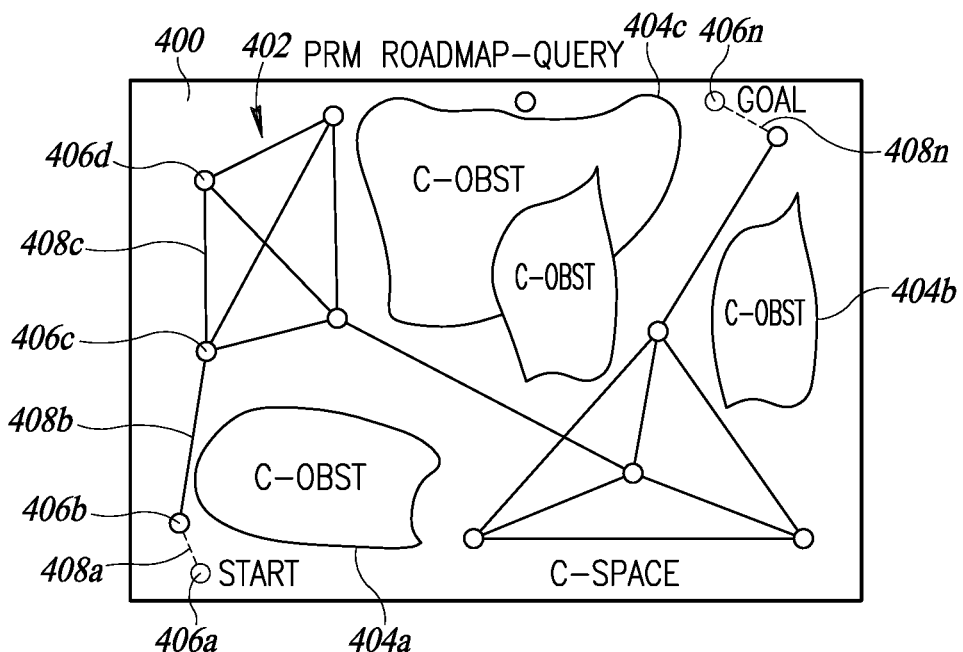
FIG. 4 is a schematic diagram of a configuration space (C-space) of the robot and environment of FIG. 1 with representations of obstacles in the environment, and including a planning graph or road map with edges representing collision free paths between poses of the robot, according to one illustrated implementation.

FIG. 4 shows a "configuration space" or "C-space" 400 of a robot, and a motion planning graph or road map 402 for the robot. The configuration space 400 is typically many dimensional (i.e., greater than 3 dimensions). Various obstacles 404a, 404b, 404c (four shown, only three called out, collectively 404) are represented.

The planning graph or road map 402 includes a number of nodes 406a, 406b, 406c, 406d, . . . 406n (eleven shown, only five called out, collectively 406) which represent respective states of the robot, the state which may include, but is not limited to, a particular configuration of the robot (which is the complete specification of a particular set of joint positions of the robot), pose, velocity and heading of the robot. One of the states may, for example, be or represent a start state 406a. One of the states may, for example, be or represent an end or goal state 406n. The planning graph or road map 402 includes a number of edges 408a, 408b, 408c, 408d, . . . 408n (eleven shown, only five called out, collectively 408). Each edge 408 of the planning graph or road map 402 represents a transition of the robot from one state to another state. Some structures and methods suitable for motion planning and generating road maps 402 are described in commonly assigned International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS" and in commonly assigned International Patent Application Publication No. WO 2016/122840, filed Jan. 5, 2016, entitled "SPECIALIZED ROBOT MOTION PLANNING HARDWARE AND METHODS OF MAKING AND USING SAME".

A wide variety of algorithms are used to solve motion planning problems. Each of these algorithms need to be able to determine whether a given pose or a motion from one pose to another pose results in a collision.

Collision detection hardware, software and/or firmware described herein can determine or compute whether a single robot pose or a robot motion from one pose (e.g., a start pose) to another pose (e.g., an end pose) causes a portion of a robot to collide with either another portion of the robot or with any object in a current environment in which the robot operates. The environment typically includes obstacles, and may or may not include one or more target objects with which the robot will intentionally engage in performing tasks (e.g., grasping and moving a target object). As previously noted, for some of the obstacles, a respective volume occupied by the obstacles is known at a time at which a model or computational circuitry is configured, a time denominated as configuration time, and is expected to remain unchanged throughout robot operation, a time denominated as run time. These obstacles are denominated as persistent obstacles since a volume the object(s) occupies is known during configuration time and is expected to stay unchanged through run time. For other obstacles, a respective volume the obstacle(s) occupies is not known at the configuration time, and is only determined at run time. These obstacles are denominated as transient obstacles since a volume the obstacle(s) occupies is not known during configuration time. A respective volume occupied by one or more of these transitory obstacles may be fixed or non-moving or unchanging over time and denominated as a static obstacles. A respective volume occupied by one or more of these transitory objects may be moving or changing over time and denominated as dynamic obstacles.

The collision detection hardware, software and/or firmware described herein can be implemented as a subroutine or function which is called or invoked by various motion planning algorithms for instance probabilistic road map (PRM), rapidly exploring random tree (RRT), RRT*, bi-directional RRT, etc. algorithms. The collision detection hardware, software and/firmware described herein can also be used to accelerate grasp planning by quickly evaluating many candidate grasp poses.

Various implementations described herein typically employ two or three configuration time inputs: i) a kinematic model of the robot; ii) a representation of persistent obstacles or objects in the environment; and optionally a motion subdivision granularity value or specification. The kinematic model of the robot includes constraints (e.g., a minimum and maximum angle of an elbow joint) on any of a number of joints of the robot, a transformation from each link of a robot to a respective parent link of the robot, an axis of each joint of the robot, and the a specification of a geometry of each link of the robot.

Various implementations described herein typically employ two or three run time inputs: a) start pose; b) optionally end pose where motion is being evaluated; and c) a representation of transient obstacles or objects in the environment that are known at run time but not known at configuration. Transient obstacles or objects may be static (i.e., fixed or not moving or not changing shape during a relevant or run time period) or dynamic (i.e., moving or changing shape during at least a portion of the relevant or run time period). For a robot with a number D degrees of freedom, a pose may be specified as a D-tuple, where each element of the tuple specifies a position or rotation of that degree of freedom (joint).

As previously noted, implementing efficient hardware for collision detection can be realized via careful attention to the selection of data structures to represent objects, poses, and/or motions. Well-chosen data structures can advantageously reduce the amount of memory required for storage, the amount of hardware required for collision detection, the latency to perform collision detection, and power consumption. The description provided here provide a number of exemplary data structures which may be suitable, although one of skill in the art will recognize that other structures could be employed used based on the teachings herein. There are a variety of options, each option associated with a respective tradeoff between latency and accuracy.

A number of processes or method of operation of a collision detection system are illustrated in FIGS. 5-13, and discussed below.

Figure 5:
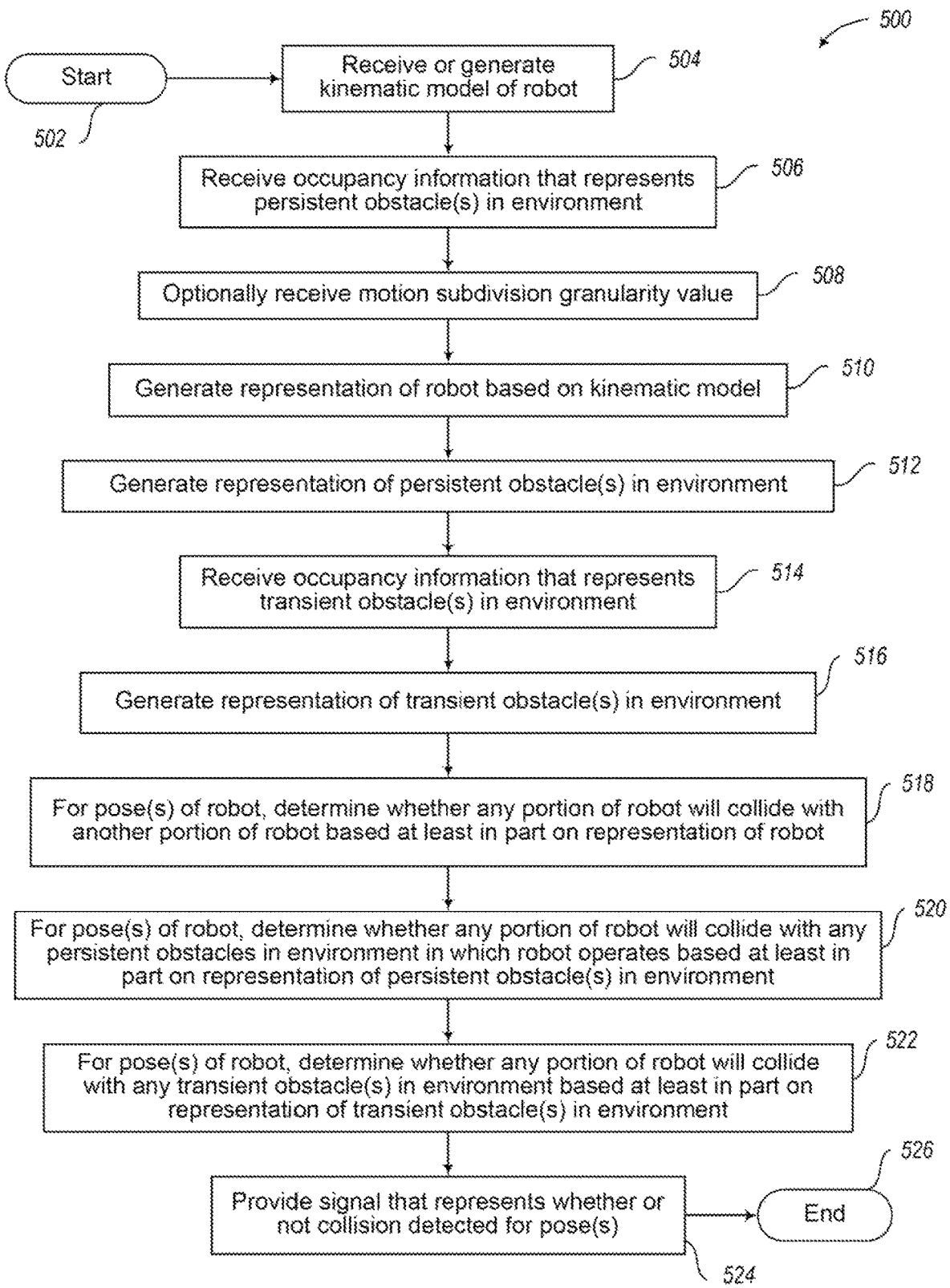
FIG. 5 is a flow diagram showing a high level method of operation in a collision detection system to perform collision detection or prediction employing data structure representations of a robot kinematic model, persistent obstacles in the environment and transient obstacles in the environment, according to one illustrated implementation, the collision detection employable in motion planning via a motion planning system.

FIG. 5 is a flow diagram showing a high level method 500 of operation in a processor-based system (e.g., robot control system 126, collision detection system 140, 200) to perform collision detection or assessment or prediction useful in motion planning and the production of motion plans, according to one illustrated embodiment. The motion plans may be executable by robots, for example robots with one or more robotic appendages that each comprise one or more links, joints between respective pair of links and one or more actuators. The method 500 advantageously allows changes that occur in the environment (e.g., introduction of an obstacle, removal of an obstacle, change in position, orientation or shape of an obstacle) to be taken into account during the run time.

The method 500 starts at 502, for example in response to a call via a calling routine or module, or in response to receipt of a signal or detection of an application of power to the collision detection system 200.

At 504, at least one component of the processor-based system (e.g., collision detection system 140, 200) receives a kinematic model that represents the robot, for example that represents a robotic appendage with a number of links and a number of joints, the joints between respective pairs of the links. The kinematic model can be in any known or to be developed format.

At 506, at least one component of the processor-based system (e.g., collision detection system 140, 200) receives occupancy information that represents a set of persistent obstacles in the environment. The occupancy information may, for example, represent respective volumes occupied by each persistent obstacle of the set of persistent obstacles in the environment. The occupancy information may be in any known or to be developed format. The occupancy information may be generated by one or more sensors, or may be defined or specified via a computer or even by a human. The occupancy information is typically received before or during a configuration time.

Optionally at 508, at least one component of the processor-based system (e.g., collision detection system 140, 200) receives at least one value or specification that represents a motion subdivision granularity to be employed in motion planning. The motion subdivision granularity defines a maximum spacing that is acceptable for the particular problem. The motion subdivision granularity may be previously defined or specified, for instance based on a type of problem, type of scenario, type of robot, and/or the particular robot. Alternatively, the motion subdivision granularity may be provided or specified by a user via any common input device (e.g., keyboard, keypad, computer mouse, touchscreen display, microphone).

At 510, at least one component of the processor-based system (e.g., collision detection system 140, 200) generates a data structure representation of the robot based, at least in part, on the kinematic model of the robot. The data structure representation includes a representation of a number of links and joints. Various suitable data structures and techniques, for example various hierarchical data structures (e.g., tree data structures) or non-hierarchical data structures (e.g., EDF data structures), are discussed elsewhere herein.

At 512, at least one component of the processor-based system (e.g., collision detection system 200) generates a data structure representation of a set of persistent objects in the environment in which the robot will operate. The data structure representation includes a representation of a number of obstacles which, at a configuration time, have a known fixed location and orientation in the environment, and hence denominated as persistent in that those objects are assumed to persist in the environment at the known location and orientation from the configuration time through a run time. Various suitable data structures, for example various hierarchical data structures (e.g., tree data structures) or non-hierarchical data structures (e.g., EDF data structures) and techniques, are discussed elsewhere herein.

At 514, at least one component of the processor-based system (e.g., collision detection system 200) receives occupancy information that represents respective locations of the set of transient obstacles in the environment. The occupancy information is typically generated by one or more sensors positioned and oriented to sense the environment in which the robot will operate or operates. The occupancy information may be in any known or to be developed format. The occupancy information is typically received during a run time, following the configuration time.

At 516, at least one component of the processor-based system (e.g., collision detection system 140, 200) generates a data structure representation of a set of transient objects in the environment in which the robot will operate. The data structure representation includes a representation of a number of transient obstacles, if any, which, during at least some portion of the run time has a known location and orientation in the environment and which at the configuration time did not have a known fixed location or orientation in the environment. As described below, the data structure representation of the set of transient objects in the environment may be generated based on sensor data produced by one or more sensors positioned and oriented to sense physical characteristics of the environment at or during run time. Various suitable data structures, for example various hierarchical data structures (e.g., tree data structures) or non-hierarchical data structures (e.g., EDF data structures) and techniques, are discussed elsewhere herein.

At 518, for each of at least a first number of poses of the robot at least one component of the processor-based system (e.g., collision detection system 140, 200) determines or assesses or predicts whether any portion of the robot will collide with another portion of the robot based at least in part on a data structure representation of the robot. The specific technique for determining whether a collision would result may depend at least in part on the type of data structure employed and/or based in part on the particular type of geometry or geometries employed to represent the robot. Various techniques for determining whether a collision would result are described elsewhere herein, for example in discussion of the various other methods and the examples set out below.

At 520, for each of at least a second number of poses of the robot at least one component of the processor-based system (e.g., collision detection system 140, 200) determines or assesses or predicts whether any portion of the robot will collide with any persistent obstacles in an environment in which the robot operates based at least in part on a data structure representation of a set of persistent obstacles in the environment. As noted above, the data structure representation of persistent obstacles includes a representation of a number of obstacles which, at a configuration time, are known to occupy respective volumes that are not expected to move or change throughout a subsequent period during operation of the robot in carrying out a task (e.g., run time). The specific technique for determining whether a collision would result may depend at least in part on the type of data structure employed and/or based in part on the particular type of geometry or geometries employed to represent the persistent obstacles and the robot. Various techniques for determining whether a collision would result are described elsewhere herein, for example in discussion of the various other methods and the examples set out below.

At 522, for each of at least a third number of poses of the robot at least one component of the processor-based system (e.g., collision detection system 140, 200) determines or assesses or predicts whether any portion of the robot will collide with any transient obstacles in the environment based at least in part on a data structure representation of the set of transient objects in the environment. As noted above, the data structure representation of transient obstacles includes a representation of a number of obstacles in the environment, if any, which, during at least some portion of a run time occupies a known volume (e.g., location, orientation, shape and size) in the environment and which at the configuration time did not have a known volume that the transient obstacle occupies in the environment. The specific technique for determining whether a collision would result may depend at least in part on the type of data structure employed and/or based in part on the particular type of geometry or geometries employed to represent the transient obstacles and the robot. Various techniques for determining whether a collision would result are described elsewhere herein, for example in discussion of the various other methods and the examples set out below.

At 524, at least one component of the processor-based system (e.g., collision detection system 140, 200) provides a signal that represents whether or not a collision has been detected for at least one of the poses. The signal preferably represents a Boolean value (e.g., 0, 1; True, False, Yes, No). Thus, the method 500 can serve as a subroutine or function called or invoked by another routine or a calling function, for example via calls in accordance with a defined application programming interface (API).

The method 500 may terminate at 526, for example until called or invoked again. Alternatively, the method 500 may execute continuously, or, for example as multiple threads on a multi-threaded processor.

Figure 6:
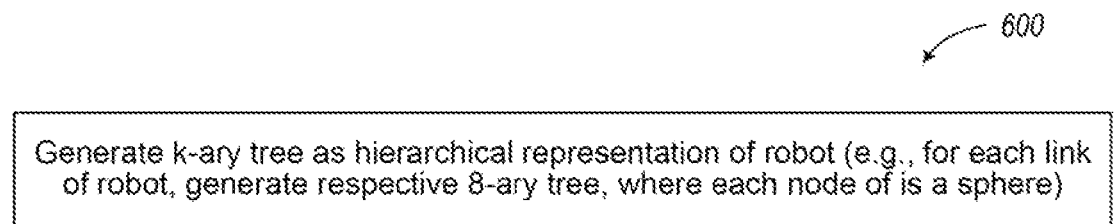
FIG. 6 is a low level flow diagram showing a method of operation in a collision detection system to facilitate motion planning and the production of motion plans via generation of a data structure representation of a robot represented by a kinematic model, according to one illustrated implementation.

FIG. 6 is a flow diagram showing a low level method 600 of operation in a processor-based system (e.g., robot control system 126, collision detection system 140, 200) to perform collision detection or assessment or prediction useful in motion planning and the production of motion plans, according to one illustrated embodiment. The method 600 may be executed in performing the method 500 (FIG. 5), for example in generating a representation of the robot based, at least in part, on the kinematic model that represents the robot 510 (FIG. 5).

At 602, at least one component of the processor-based system (e.g., collision detection system 140, 200) generates a data structure representation of the robot represented by the kinematic model. For example, for each link of the robot, the collision detection system 200 generates a respective tree, for instance with a tree depth equal to or greater than four (e.g., 8-ary tree) as hierarchical representation of robot. Also for example, for each link of the robot the collision detection system 200 may generate a respective k-ary tree, where each node of the k-ary tree is a sphere, each node identified as occupied if any portion of respective sphere is occupied.

Figure 7A:
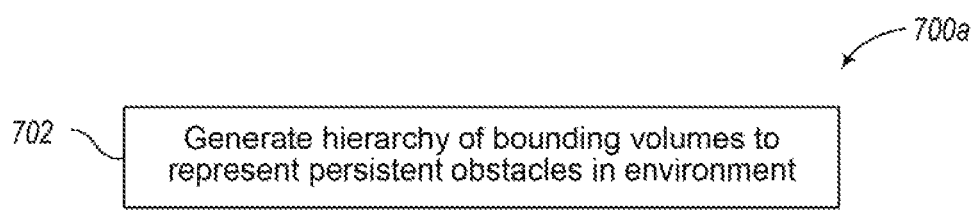
FIG. 7A is a flow diagram showing a low level method of operation in a collision detection system to facilitate motion planning and the production of motion plans via generation of a hierarchy of bounding volumes to represent persistent objects in an environment, according to one illustrated implementation.

FIG. 7A is a flow diagram showing a low level method 700*a* of operation in a processor-based system (e.g., robot control system 126, collision detection system 140, 200) to perform collision detection or assessment or prediction useful in motion planning and the production of motion plans, according to one illustrated embodiment. The method 700*a* may be executed in performing the method 500 (FIG. 5), for example in generating a data structure representation of a set of persistent obstacles in the environment in which the robot will operate 512 (FIG. 5).

At 702, at least one component of the processor-based system (e.g., collision detection system 140, 200) generates a hierarchy of bounding volumes to represent persistent obstacles in an environment. For example, the collision detection system 200 generates a tree of axis-aligned bounding boxes (AABBs), a tree of oriented (not axis-aligned) bounding boxes, or a tree of spheres. Notably, the leaves of any of these tree type data structures can be a different shape than the other nodes of the data structure, e.g., all nodes are AABBs except the root nodes which may take the form of triangle meshes.

Figure 7B:
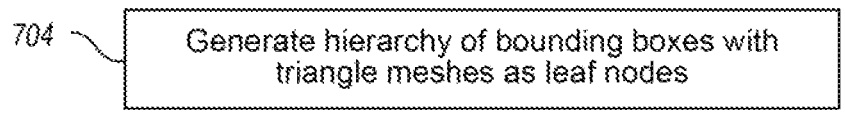
FIG. 7B is a flow diagram showing a low level method of operation in a collision detection system to facilitate motion planning and the production of motion plans via generation of a hierarchy of bounding boxes with triangle meshes as leaf nodes to represent persistent objects in an environment, according to one illustrated implementation.

FIG. 7B is a flow diagram showing a low level method 700*b* of operation in a processor-based system (e.g., robot control system 126, collision detection system 140, 200) to perform collision detection or assessment or prediction useful in motion planning and the production of motion plans, according to one illustrated embodiment. The method 700*b* may be executed in performing the method 700*a* (FIG. 7), for example in generating a hierarchy of bounding volumes to represent persistent obstacles in environment in which the robot will operate 702 (FIG. 7).

At 704, at least one component of the processor-based system (e.g., collision detection system 140, 200) generates a hierarchy of bounding boxes with triangle meshes as leaf nodes that represent the persistent obstacles in the environment. As noted above, the leaves of the tree type data structure can be a different shape than the other nodes of the data structure, e.g., all nodes are AABBs except the root nodes which may take the form of triangle meshes.

Figure 7C:
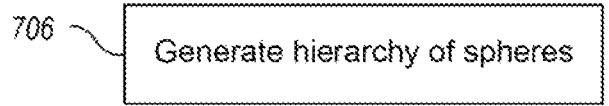
FIG. 7C is a flow diagram showing a low level method of operation in a collision detection system to facilitate motion planning and the production of motion plans via generation of a hierarchy of spheres to represent persistent objects in an environment, according to one illustrated implementation.

FIG. 7C is a flow diagram showing a low level method 700*c* of operation in a processor-based system (e.g., robot control system 126, collision detection system 140, 200) to perform collision detection or assessment or prediction useful in motion planning and the production of motion plans, according to one illustrated embodiment. The method 700*c* may be executed in performing the method 700*a* (FIG. 7), for example in generating a hierarchy of bounding volumes to represent persistent obstacles in environment in which the robot will operate 702 (FIG. 7).

At 706 at least one component of the processor-based system (e.g., collision detection system 140, 200) generates a hierarchy of spheres that represent the persistent obstacles in the environment. Using spheres as bounding volumes facilitates fast comparisons (i.e., it is computationally easy to determine if spheres overlap each other).

Figure 7D:
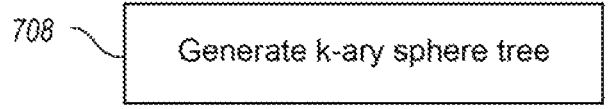
FIG. 7D is a flow diagram showing a low level method of operation in a collision detection system to facilitate motion planning and the production of motion plans via generation of a k-ary sphere tree to represent persistent objects in an environment, according to one illustrated implementation.

FIG. 7D is a flow diagram showing a low level method 700*d* of operation in a processor-based system (e.g., robot control system 126, collision detection system 140, 200) to perform collision detection or assessment or prediction useful in motion planning and the production of motion plans, according to one illustrated embodiment. The method 700*d* may be executed in performing the method 700*a* (FIG. 7), for example in generating a hierarchy of bounding volumes to represent persistent obstacles in environment in which the robot will operate 702 (FIG. 7).

At 708, at least one component of the processor-based system (e.g., collision detection system 140, 200) generates a k-ary sphere tree that represent the persistent obstacles in the environment. As noted above, using spheres as bounding volumes facilitates fast comparisons (i.e., it is computationally easy to determine if spheres overlap each other).

Figure 7E:
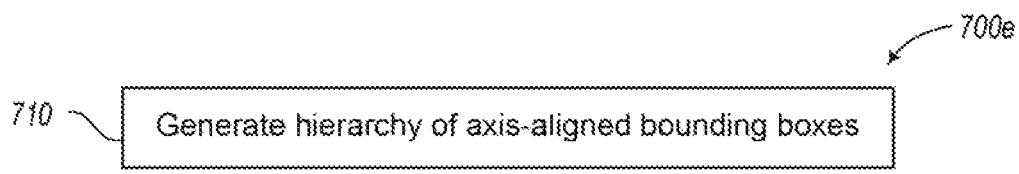
FIG. 7E is a flow diagram showing a low level method of operation in a collision detection system to facilitate motion planning and the production of motion plans via generation of a hierarchy of axis-aligned bounding boxes to represent persistent objects in an environment, according to one illustrated implementation.

FIG. 7E is a flow diagram showing a low level method 700*e* of operation in a processor-based system (e.g., robot control system 126, collision detection system 140, 200) to perform collision detection or assessment or prediction useful in motion planning and the production of motion plans, according to one illustrated embodiment. The method 700*e* may be executed in performing the method 700*a* (FIG. 7), for example in generating a hierarchy of bounding volumes to represent a set persistent obstacles in environment in which the robot will operate 702 (FIG. 7).

At 710, at least one component of the processor-based system (e.g., collision detection system 140, 200) generates a hierarchy of axis-aligned bounding boxes (AABB) that represent the persistent obstacles in the environment.

Figure 7F:
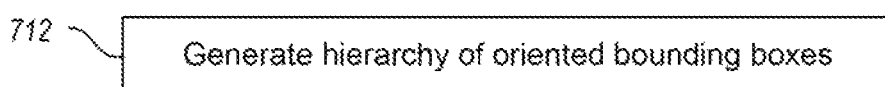
FIG. 7F is a flow diagram showing a low level method of operation in a collision detection system to facilitate motion planning and the production of motion plans via generation of a hierarchy of oriented bounding boxes to represent persistent objects in an environment, according to one illustrated implementation.

FIG. 7F is a flow diagram showing a low level method 700*f* of operation in a processor-based system (e.g., robot control system 126, collision detection system 140, 200) to perform collision detection or assessment or prediction useful in motion planning and the production of motion plans, according to one illustrated embodiment. The method 700*f* may be executed in performing the method 700*a* (FIG. 7), for example in generating a hierarchy of bounding volumes to represent persistent obstacles in environment in which the robot will operate 702 (FIG. 7).

At 712, at least one component of the processor-based system (e.g., collision detection system 140, 200) generates a hierarchy of oriented bounding boxes that represent the persistent obstacles in the environment.

Figure 7G:
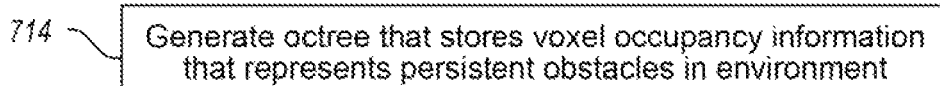
FIG. 7G is a flow diagram showing a low level method of operation in a collision detection system to facilitate motion planning and the production of motion plans via generation of an octree that stores voxel occupancy information to represent persistent objects in an environment, according to one illustrated implementation.

FIG. 7G is a flow diagram showing a low level method 700*g* of operation in a processor-based system (e.g., robot control system 126, collision detection system 140, 200) to perform collision detection or assessment or prediction useful in motion planning and the production of motion plans, according to one illustrated embodiment. The method 700*g* may be executed in performing the method 500 (FIG. 5), for example in generating a data structure representation of a set of persistent obstacles in the environment in which the robot will operate 512 (FIG. 5).

At 714, at least one component of the processor-based system (e.g., collision detection system 140, 200) generates an octree that stores voxel occupancy information that represents persistent obstacles in environment.

Figure 8:
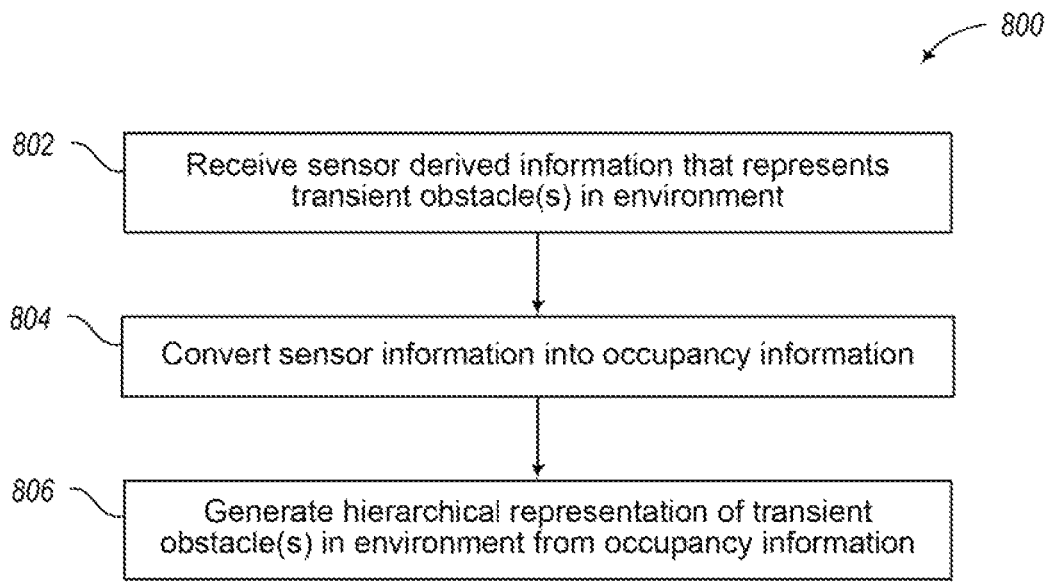
FIG. 8 is a flow diagram showing a low level method 800 of operation in a collision detection system 200 to facilitate motion planning and the production of motion plans via receiving sensor data for an environment, converting sensor data to occupancy information and generation data structure representations of transient objects in the environment, according to one illustrated implementation.

FIG. 8 is a flow diagram showing a low level method 800 of operation in a processor-based system (e.g., robot control system 126, collision detection system 140, 200) to perform collision detection or assessment or prediction useful in motion planning and the production of motion plans, according to one illustrated embodiment. The method 800 may be executed in performing the method 500 (FIG. 5), for example in generating a data structure representation of a set of transient obstacles in the environment in which the robot will operate 516 (FIG. 5).

At 802, at least one component of the processor-based system (e.g., collision detection system 140, 200) or hub or environmental sensor system controller 124 (FIG. 1) receives sensor derived information that represents transient obstacle(s) in environment. The sensor data may be received directly from one or more sensors, although is typically routed to the collision detection system 200 via the hub or environmental sensor system controller 124 (FIG. 1). Some or all of the sensor information may take the form of raw or pre-processed data, and may be formatted in any existing or later created format or schema.

At 804, at least one component of the processor-based system (e.g., collision detection system 140, 200) or the hub or environmental sensor system controller 124 (FIG. 1) converts the sensor information into occupancy information. The occupancy information may be formatted in any existing or later recreated format or schema.

At 806, at least one component of the processor-based system (e.g., collision detection system 140, 200) generates a data structure representation of transient obstacle(s) in environment from occupancy information. As discussed herein, any of a number of hierarchical representation types may be employed, including various tree structures. Alternatively, various non-hierarchical representations may be employed, for example a Euclidian Distance Field (EDF) representation. The various operations and respective hierarchical and/or non-hierarchical representations discussed with reference to FIGS. 7A-7G employed to generate the hierarchical and/or non-hierarchical representation of the persistent obstacles may be employed to generate a hierarchical and/or non-hierarchical representation of the transient obstacles. Such is not repeated here in the interest of conciseness.

Figure 9:
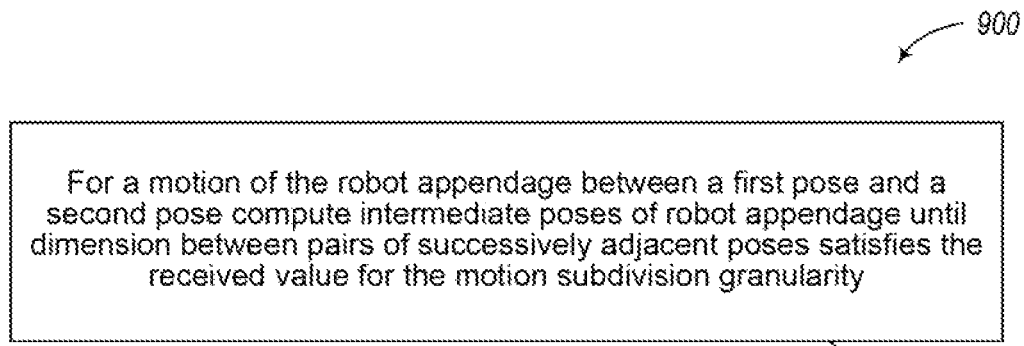
FIG. 9 is a flow diagram showing a low level method 900 of operation in a collision detection system to facilitate motion planning and the production of motion plans via computation of intermediate poses of robot appendage between a two poses of a motion of the robot appendage, according to one illustrated implementation.

FIG. 9 is a flow diagram showing a low level method 900 of operation in a processor-based system (e.g., robot control system 126, collision detection system 140, 200) to perform collision detection or assessment or prediction useful in motion planning and the production of motion plans, according to one illustrated embodiment. The method 900 may be executed in performing the method 500 (FIG. 5), for example in determining whether any portion of the robot will collide with another portion of the robot 518, determining whether any portion of the robot will collide with any persistent obstacles 520, or determines whether any portion of the robot will collide with any transient obstacles 522 (FIG. 5).

At 902, for a motion of the robot appendage between a first pose and a second pose at least one component of the processor-based system (e.g., collision detection system 140, 200) computes a number of intermediate poses of robot appendage. For example, the collision detection system 200 may compute a plurality of intermediate poses between the first and the second poses of the robot appendage in a C-space of the robot until dimension between pairs of successively adjacent poses satisfies the received value for the motion subdivision granularity.

Figure 10:
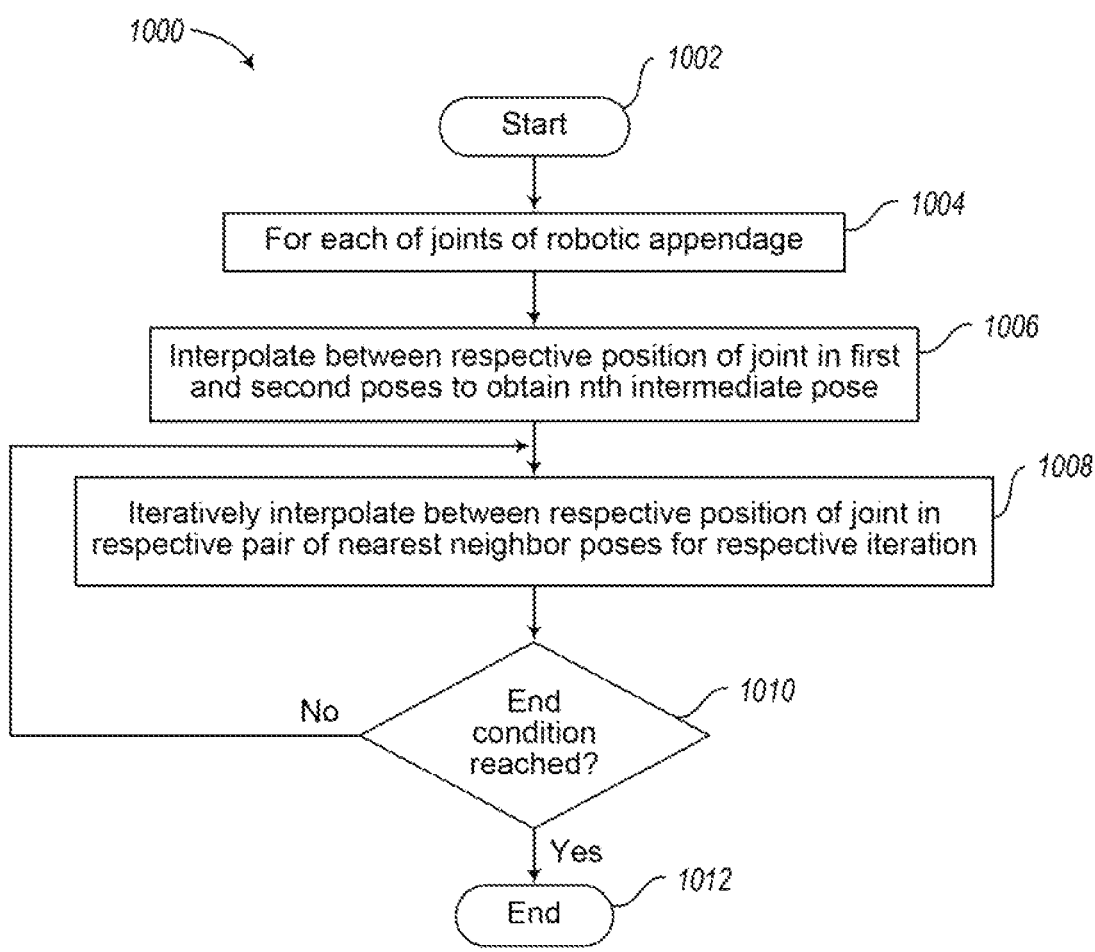
FIG. 10 is a flow diagram showing a low level method 1000 of operation in a collision detection system to facilitate motion planning and the production of motion plans via execution of an iterative loop to determine intermediate poses, according to one illustrated implementation.

FIG. 10 is a flow diagram showing a low level method 1000 of operation in a processor-based system (e.g., robot control system 126, collision detection system 140, 200) to perform collision detection or assessment or prediction useful in motion planning and the production of motion plans, according to one illustrated embodiment. The method 1000 may be executed in performing the method 500 (FIG. 5), for example in computing a number of intermediate poses of robot appendage 902 (FIG. 9).

The method 1000 may start at 1002, for example in response to a call via a calling routine or module, or in response to receipt of a signal or detection of an application of power to at least one component of a processor-based system (e.g., collision detection system 140, 200).

At 1004, at least one component of the processor-based system (e.g., collision detection system 140, 200) executes an iterative loop for each of the joints of the robotic appendage.

In the iterative loop, at least one component of the processor-based system (e.g., collision detection system 140, 200) interpolates between respective position of joint in first and second poses to obtain nth intermediate pose at 1006.

At 1008, at least one component of the processor-based system (e.g., collision detection system 140, 200) iteratively interpolates between respective position of joint in respective pair of nearest neighbor poses for respective iteration.

At 1010, at least one component of the processor-based system (e.g., collision detection system 140, 200) determines whether end condition reached. The end condition may, for example, be that a distance between successively adjacent poses satisfies the specified motion subdivision granularity value or specification. The end condition may, for example, additionally or alternatively include a maximum number of iterations that may be completed. In response to a determination that an end condition has been met, control passes to 1012. Otherwise, control returns to 1008.

The method 1000 may terminate at 1012, for example until called or invoked again. Alternatively, the method 1000 may execute continuously, or, for example as multiple threads on a multi-threaded processor.

In other words, the algorithm starts with an initial pair of poses (e.g., pose A and pose Z). A first intermediate pose, (e.g., pose M) is found between the initial pair of poses (e.g., pose A and pose Z). Subsequently, a second intermediate pose (e.g., pose F) is found between one pose (e.g., pose A) of the initial pair of poses and the first intermediate pose (e.g., pose M). Optionally, a third intermediate pose (e.g., pose V) is found between the other pose (e.g., pose Z) of the initial pair of poses and the first intermediate pose (e.g., pose M). The algorithm can then iteratively repeat, finding poses between pairs of closest neighboring poses based on the successively found poses.

Figure 11:
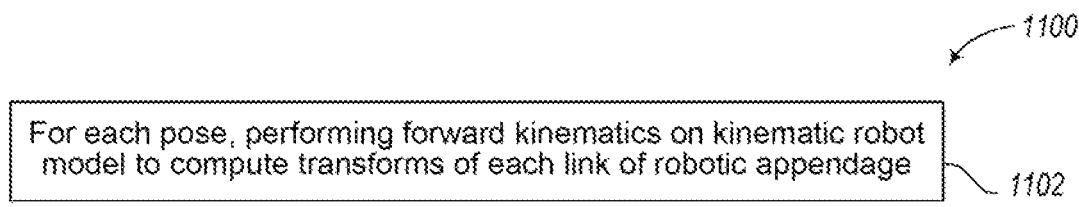
FIG. 11 is a flow diagram showing a low level method 1000 of operation in a collision detection system to facilitate motion planning and the production of motion plans employing forward kinematics to compute transforms for the robot according to one illustrated implementation.

FIG. 11 is a flow diagram showing a low level method 1100 of operation in a processor-based system (e.g., robot control system 126, collision detection system 140, 200) to perform collision detection or assessment or prediction useful in motion planning and the production of motion plans, according to one illustrated embodiment. The method 1100 may be executed in performing the method 500 (FIG. 5), for example in computing a number of intermediate poses of robot appendage 902 (FIG. 9).

At 1102, for each of a number of the poses at least one component of the processor-based system (e.g., collision detection system 140, 200) performs forward kinematics on the kinematic robot model to compute a number of transforms from C space to free space of each link of the robotic appendage.

Figure 12:
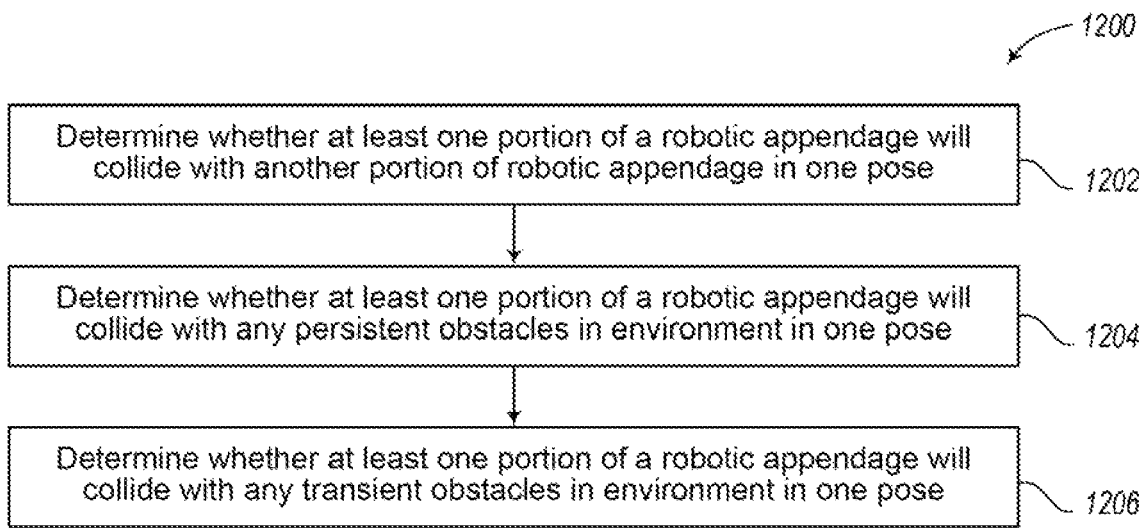
FIG. 12 is a flow diagram showing a low level method 1000 of operation in a collision detection system to facilitate motion planning and the production of motion plans via assessment of self-collision of a portion or a robot with another portion of the robot in a pose, according to one illustrated implementation.

FIG. 12 is a flow diagram showing a low level method 1200 of operation in a processor-based system (e.g., robot control system 126, collision detection system 140, 200) to perform collision detection or assessment or prediction useful in motion planning and the production of motion plans, according to one illustrated embodiment. The method 1200 may be executed in performing the method 500 (FIG. 5), for example in computing a number of intermediate poses of robot appendage 902 (FIG. 9).

At 1202, at least one component of the processor-based system (e.g., collision detection system 140, 200) determines whether at least one portion of a robotic appendage will collide with another portion of robotic appendage in one pose. Various techniques and algorithms for determining whether at least one portion of a robotic appendage will collide with another portion of robotic appendage in the one pose may be employed, including but not limited to those described herein.

At 1204, at least one component of the processor-based system (e.g., collision detection system 140, 200) determines whether at least one portion of a robotic appendage will collide with any persistent obstacles in environment in one pose. Various techniques and algorithms for determining whether at least one portion of a robotic appendage will collide with any persistent obstacles in environment in the one first pose may be employed, including but not limited to those described herein.

At 1206, at least one component of the processor-based system (e.g., collision detection system 140, 200) determines whether at least one portion of a robotic appendage will collide with any transient obstacles in environment in one pose. Various techniques and algorithms for determining whether at least one portion of a robotic appendage will collide with any transient obstacles in environment in the one first pose may be employed, including but not limited to those described herein.

Figure 13:
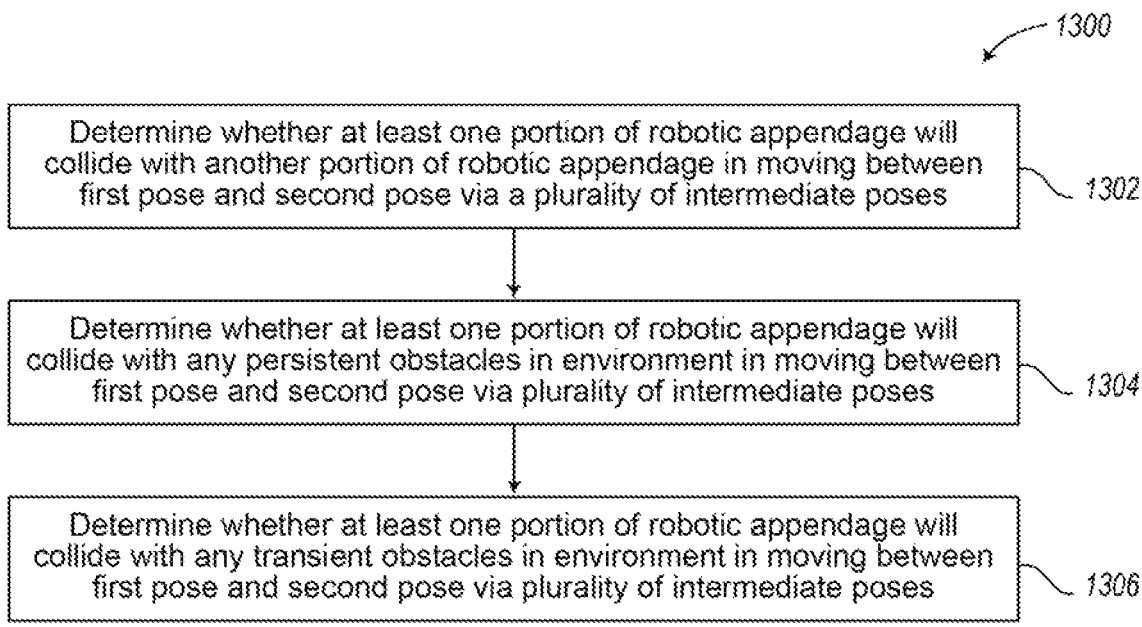
FIG. 13 is a flow diagram showing a low level method 1000 of operation in a collision detection system to facilitate motion planning and the production of motion plans via assessment of self-collision of a portion or a robot with another portion of the robot in moving from one pose to another pose, according to one illustrated implementation.

FIG. 13 is a flow diagram showing a low level method 1300 of operation in a processor-based system (e.g., robot control system 126, collision detection system 140, 200) to perform collision detection or assessment or prediction useful in motion planning and the production of motion plans, according to one illustrated embodiment. The method 1300 may be executed in performing the method 500 (FIG. 5), for example in computing a number of intermediate poses of robot appendage 902 (FIG. 9).

At 1302, at least one component of the processor-based system (e.g., collision detection system 140, 200) determines whether at least one portion of robotic appendage will collide with another portion of robotic appendage in moving between one pose (e.g., a first pose) and another pose (e.g., a second pose) via a plurality of intermediate poses which the robotic appendage will pass through in moving from the one pose to the other pose.

At 1304, at least one component of the processor-based system (e.g., collision detection system 140, 200) determines whether at least one portion of robotic appendage will collide with any persistent obstacles in environment in moving between one pose (e.g., a first pose) and another pose (e.g., a second pose) via a plurality of intermediate poses which the robotic appendage will pass through in moving from the one pose to the other pose.

At 1306, at least one component of the processor-based system (e.g., collision detection system 140, 200) determines whether at least one portion of robotic appendage will collide with any transient obstacles in environment in moving between one pose (e.g., a first pose) and another pose (e.g., a second pose) via a plurality of intermediate poses which the robotic appendage will pass through in moving from the one pose to the other pose.

EXAMPLES

Various geometries can be efficiently represented with, for example, any of octrees, sets of boxes, or Euclidean distance fields (EDFs).

An octree is a hierarchical data structure to store voxel occupancy data. A tree structure allows collision detection to descend only as far into an inherent hierarchy of the trees' structure as needed, increasing computational efficiency of a collision detection process. One benefit of an octree is the inherent hierarchy. There are of course other data structures that are hierarchical and which may be suitable.

Sets of boxes may take a variety of forms, for example: a tree of axis-aligned bounding boxes (AABBs), a tree of oriented (not axis-aligned) bounding boxes, or a tree of spheres. Notably, the leaves of any of these tree type data structures can be a different shape than the other nodes of the data structure, e.g., all nodes are AABBs except the root nodes which may take the form of triangle meshes. The selection of a bounding volume representation comes with a tradeoff between the latency required to build the corresponding data structure and a latency of computing collisions, for example including how much of a tree needs to be traversed before the collision detection is complete. For example, using spheres as bounding volumes facilitates fast comparisons (i.e., it is computationally easy to determine if spheres overlap each other). For instance, as discussed elsewhere herein, it may be preferable to use a k-ary sphere tree to represent each link of a robot. In some implementations, the voxels in representing the environment can be grouped together into a set of AABB. This could simplify the voxel data sufficiently that it would be computationally faster and more memory efficient than employing octrees in some circumstances.

A EDF discretizes a workspace into a 3D grid of voxels, and the value of each voxel encodes a distance to a nearest obstacle in that workspace. The workspace encompasses all of the space that a robot might possibly reach in any pose of the robot.

In the typical problem, there are three types of items that are represented: i) robots, ii) persistent obstacles, and iii) transitory obstacles. Any of the above described geometries may be selected to represent any of these items.

Robots

A robot can be modeled as a tree of links connected by joints. For a single robot appendage or arm, this "tree" is often unary, but can be more general, e.g., with a link that has two or more child links.

To efficiently represent a robot and facilitate computationally simple collision detection, it may be advantageously preferable to represent each of the links of the robot with a respective k-ary sphere tree. For example, each link may be represented with a respective 8-ary tree of depth 4, with a total of 585 spheres.

A k-ary tree is a tree in which each parent has k children. For example, a k-ary tree may take the form of a k-ary sphere tree where each node of the k-ary sphere tree is a sphere that is considered occupied if any part of that sphere is occupied. Consider a robot link represented by a triangle mesh. The root of the tree would be a sphere that encloses the entire link. The k children would be spheres that together cover all of the constituent triangles of the link geometry, and, because they are spheres, will necessarily overlap each other, too. Each of these children has k children, etc. For an implementation that employs an 8-ary tree of depth 4, that leads to 585 spheres to represent the link: 1 for the root, 8 for the root's children, 64 at the next level, and 512 at the leaf level, as represented in FIGS. 14A-14E, described below.

Figure 14A:
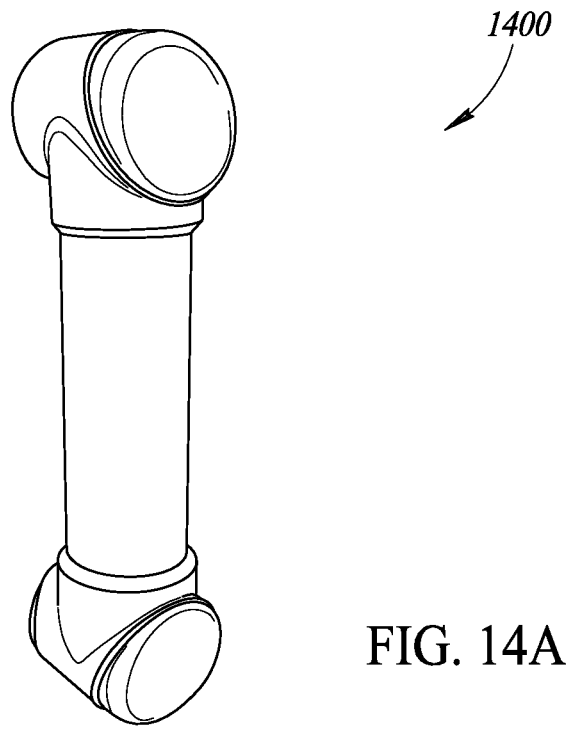
FIG. 14A is an isometric view of a portion of a robotic appendage represented as triangle mesh, according to one illustrated implementation.
Figure 14B:
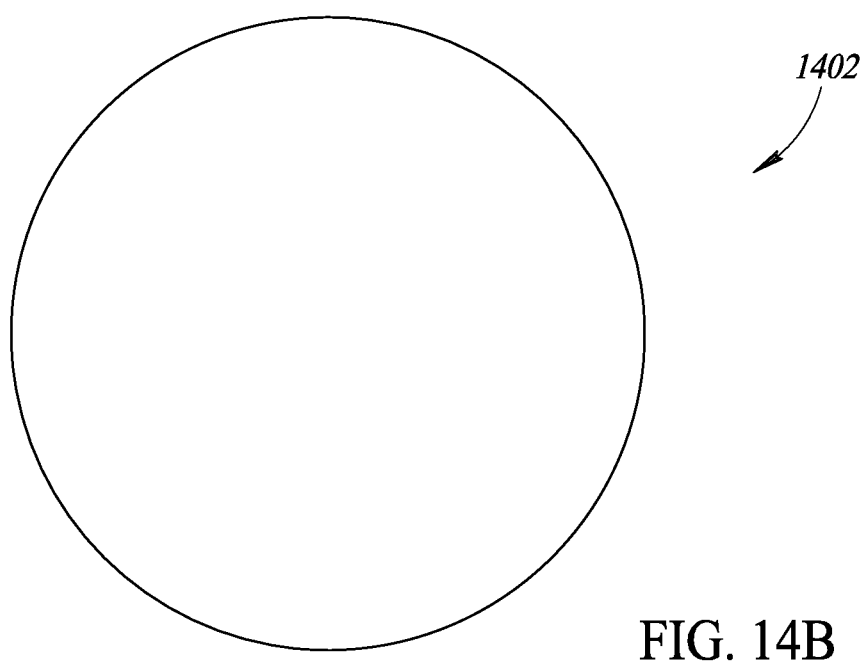
FIG. 14B-14E are isometric views of the portion of the robotic appendage of FIG. 14A, depicted as represented in successive levels of a sphere tree of depth 4, according to one illustrated implementation.
Figure 14C:
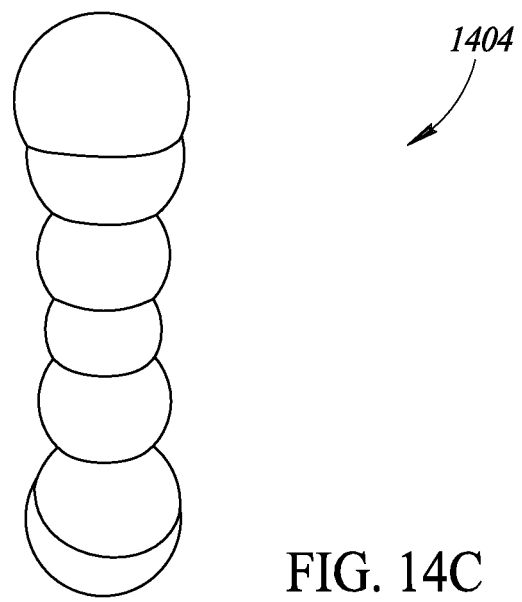
Figure 14D:
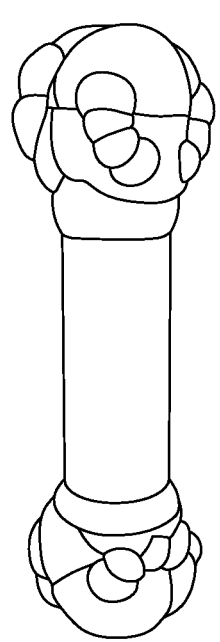
Figure 14E:
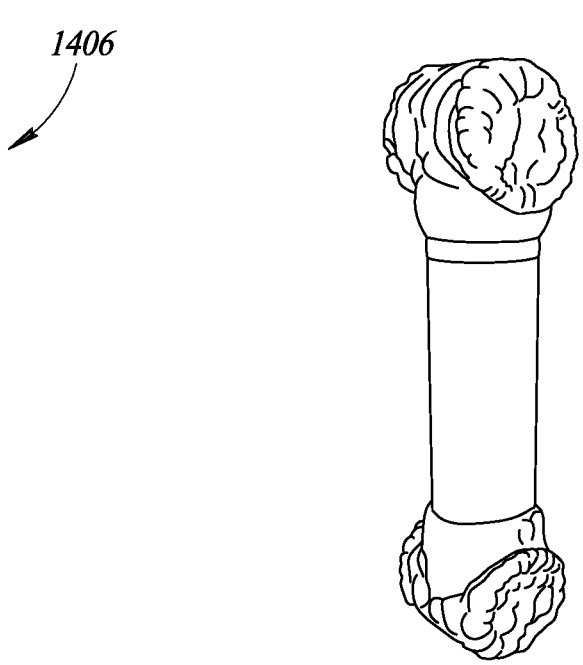

FIG. 14A shows a portion of a robotic appendage represented as triangle mesh 1400, according to one illustrated implementation.

In this example, a data structure in the form of a sphere tree of depth 4 will be used to approximately represent the robotic appendage, as illustrated via the sequence of FIGS. 14B, 14C, 14D and 14E.

In particular, FIGS. 14B, 14C, 14D and 14E respectively depicts the 4 successive levels of a sphere tree. At a first level illustrated in FIG. 14B, a single sphere 1402 encompasses the entire robotic appendage 1400. At a second level illustrated in FIG. 14C, eight spheres 1404 (not called out individually) encompass the entire robotic appendage 1400. At a third level illustrated in FIG. 14D, sixty-four spheres 1406 (not called out individually) encompass the entire robotic appendage 1400. At a third level illustrated in FIG. 14D, five-hundred and twelve spheres 1406 (not called out individually) encompass the entire robotic appendage 1400.

Obstacles

For obstacles that will occupy a consistent or unchanging volume in an environment throughout a run time and where that occupied volume is known at a configuration time, it may be preferable to represent those persistent obstacles with a Euclidean distance field.

For obstacles that will occupy an inconsistent or changing volume in an environment during a run time, or for which a presence or absence during the run time is not known at a configuration time, specific information characterizing the occupied volume (e.g., position, size), if any, is captured by one or more sensors and discerned from that capture information. While the specific sensor technology employed in most situations may not matter, sensor data will be provided in some defined format (e.g., a point cloud). The processor-based system can transform the received sensor data or information into an occupancy grid. It may be preferable to use axis-aligned bounding boxes to represent obstacles, for example in a list or in a tree structure, or in an octree.

Figure 15A:
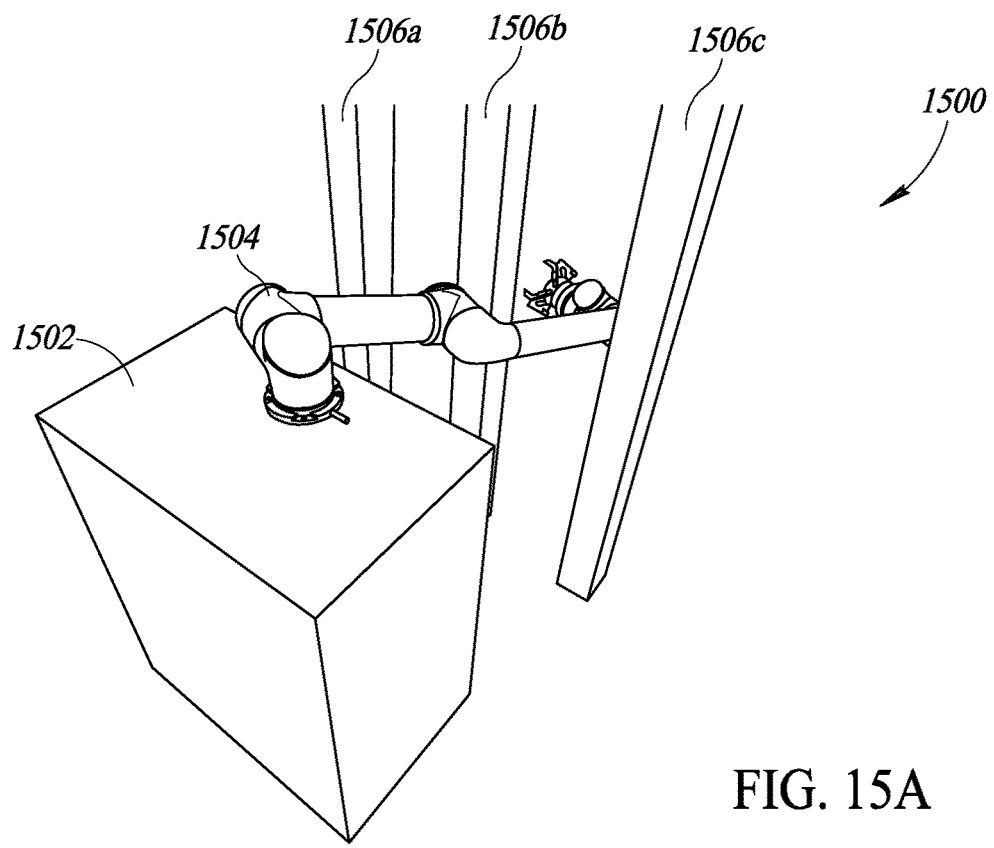
FIG. 15A is an isometric view of an environment in which a robot with a robotic appendage represented by triangle meshes, which performs tasks with a number of obstacles (e.g., poles), according to one illustrated embodiment.

FIG. 15A shows an environment 1500 in which a robot 1502 with a robotic appendage 1504 performs tasks with a number of obstacles 1506a, 1506b, 1506c (e.g., poles), according to one illustrated embodiment, in which the geometry of the robotic appendage 1504 is represented by triangle meshes.

Figure 15B:
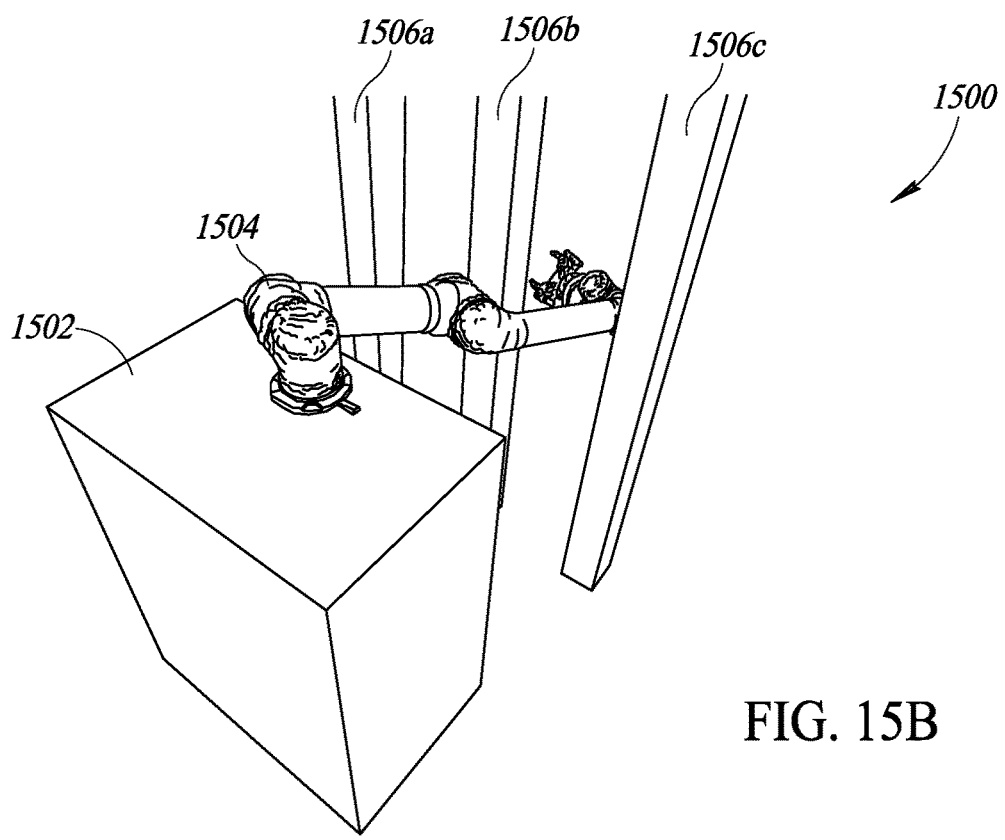
FIG. 15B is an isometric view of the environment of FIG. 15A in which the representation of the robotic appendage has been converted to sphere trees, according to one illustrated embodiment.

FIG. 15B shows the environment 1500 of FIG. 15A in which the representation of the geometry of the robotic appendage 1504 has been converted to sphere trees, according to one illustrated embodiment.

Notable, once the robotic appendage geometry has been converted to sphere trees, and the scene has been converted to a EDF, the scenario looks like that depicted in FIG. 15B. Note that the distance field is rendered with a voxel at every location where the distance is zero.

Process

An example process for use in collision checking associated with motion (e.g., movement between two poses) is set out below.

The processor-based system (e.g., collision detection system 140, 200) computes a large number of poses between a first pose (e.g., a start) and a second pose (e.g., an end pose). This can be done, for example, by interpolating between positons of the joint or joints. For example, a start pose for a robot with two joints may be at joint position (30, 60) and end pose at joint position (40, 80). An intermediate pose may be generated at joint position (35, 70), halfway between the start and the end poses. Generation of intermediate poses may occur iteratively. For example, one or more poses between this intermediate pose and start pose and the end poses may be generated, for instance at joint position (32.5, 65) and at joint position (37.5, 75), respectively. This interpolation can continue iteratively until an end condition is reached, e.g., a condition where there are sufficient number of poses between the start and the end poses. The end condition may be defined using an input for motion subdivision granularity. For example, if a distance between poses is smaller than the motion subdivision granularity value, the end condition is satisfied and the iteration stops. Additionally, a maximum number of iterations may be defined as an end condition, for example to enforce a latency constraint.

For each of the poses, the processor-based system (e.g., collision detection system 140, 200) performs forward kinematics on the robot model to compute the transforms from C space to free space of each of the robot links.

For each pose, the processor-based system (e.g., collision detection system 140, 200) computes whether the pose will result in any self-collisions or collisions with obstacles in the environment. If any pose (e.g., start pose, end pose, intermediate poses) in the motion will result in a collision, then the motion will result in a collision condition, and the collision detection system returns an appropriate Boolean value (e.g., COLLISION). If no pose (e.g., start pose, end pose, intermediate poses) in the motion will result in a collision, then the motion will result in a collision condition, and the collision detection system returns an appropriate Boolean value (e.g., NO COLLISION).

These operations can be overlapped (pipelined) to some extent. It is not typically necessary to wait for all poses to have been generated before collision checking the poses that have already been generated. Also, if it is determined that a pose will result in a collision, then there is no need to continue checking other poses in the motion, since that will not change the result for the particular motion.

Collision Detection

Collision detection, even in a tree structure, eventually devolves to determining whether two shapes intersect. A tree is a particularly convenient way of maintaining a set of shapes to check for intersection. Collision detection can start at a root of the tree structure and work down (i.e., towards leaf nodes). If at any level there are no intersections, then the robot and obstacle do not intersect and the process is over. If there are intersections at a non-leaf node level, the collision assessment process proceeds down to the next level of the tree structure. If there are intersections at the leaf level, the robot and the obstacle intersect.

Collision Testing Two Spheres

The exemplary pseudocode provided immediately below illustrates a testing operation to determine whether there is a collision between two spheres.

bool SpheresCollision(Sphere a, Sphere b): return Distance(a.center, b.center)<a.radius+b.radius Collision Testing Sphere and Axis-Aligned Bounding Box (AABB)

The exemplary pseudocode provided immediately below illustrates a testing operation to determine whether there is a collision between a sphere and an axis-aligned bounding box.

```
bool SphereAABBCollision(Sphere s, AABB a):
    Vector3 clamped
    Vector3 t = s.center − a.center
    for i in [0, 1, 2]:
        clamped[i] = Clamp(t[i], −a.extents[i], a.extents[i])
    Vector3 delta = t − clamped
    return Dot (delta, delta) < Square(s.radius)
```

The AABB extents field is a 3-vector representation of the half-dimension of the box along each axis. The Clamp( ) function constrains the first argument between the second and third arguments.

Collision Testing Two Sphere Trees

Determining whether objects (e.g., robot, obstacles) represented as trees collide can be fast because of the inherent hierarchical nature of the data structure. The exemplary pseudocode provided immediately below illustrates a recursive algorithm for a testing operation to determine whether there is a collision between two sphere trees.

```
bool SphereTreesCollision(Tree a, Tree b):
    Stack s
    s.Push({a, b})
    while (not s.IsEmpty):
        {a, b} = s.Pop( )
        if (SpheresCollision(a.sphere, b.sphere)):
            if (IsLeaf(a) and IsLeaf(b)):
                return TRUE
            if (DescendTreeA(a, b)):
                for child in a:
                    s.Push({child, b})
            else:
                for child in b:
                    s.Push({a, child})
    return FALSE
```

The function DescendTreeA encodes a descent rule to decide whether tree A or tree B should be explored further at this iteration.

Collision Testing Sphere Tree and Euclidean Distance Field

The collision check between a sphere tree and a distance field is similar to the two SphereTree case. Once again, the inherent hierarchical nature of the sphere tree is exploited to exit as soon as the tree has been assessed to a sufficient resolution. The exemplary pseudocode provided immediately below illustrates a testing operation to determine whether there is a collision between a sphere tree and a distance field.

```
bool SphereTreeDistanceFieldCollision(Tree t, DistanceField f):
    Stack s
    s.Push(t)
    while (not s.IsEmpty):
        t = s.Pop
        if (t.sphere.radius <= GetDistance(f, t.sphere.center)):
            if (IsLeaf(t)):
                return TRUE
            for child in t:
                s.Push(t)
    return FALSE
```

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Boolean circuits, Application Specific Integrated Circuits (ASICs) and/or FPGAs. However, those skilled in the art will recognize that the embodiments disclosed herein, in whole or in part, can be implemented in various different implementations in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being implemented in hardware, for example in one or more FPGAs or ASICs.

The various embodiments described above can be combined to provide further embodiments. All of the commonly assigned US patent application publications, US patent applications, foreign patents, and foreign patent applications referred to in this specification and/or listed in the Application Data Sheet, including but not limited International Patent Application No. PCT/US2017/036880, filed Jun. 9, 2017 entitled "MOTION PLANNING FOR AUTONOMOUS VEHICLES AND RECONFIGURABLE MOTION PLANNING PROCESSORS," International Patent Application Publication No. WO 2016/122840, filed Jan. 5, 2016, entitled "SPECIALIZED ROBOT MOTION PLANNING HARDWARE AND METHODS OF MAKING AND USING SAME"; U.S. Patent Application No. 62/616,783, filed Jan. 12, 2018, entitled, "APPARATUS, METHOD AND ARTICLE TO FACILITATE MOTION PLANNING OF AN AUTONOMOUS VEHICLE IN AN ENVIRONMENT HAVING DYNAMIC OBJECTS"; U.S. Patent Application No. 62/626,939, filed Feb. 6, 2018, entitled "MOTION PLANNING OF A ROBOT STORING A DISCRETIZED ENVIRONMENT ON ONE OR MORE PROCESSORS AND IMPROVED OPERATION OF SAME"; and U.S. Patent Application No. 62/722,067, filed Aug. 23, 2018, entitled "COLLISION DETECTION USEFUL IN MOTION PLANNING FOR ROBOTICS" are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation of at least one component of a processor-based system useful in motion planning for robotics, the method comprising:

during a configuration time,
for a robot represented by a kinematic model, generating a data structure representation of the robot, the data structure representation of the robot in a form of a hierarchical tree structure; and for an environment, generating a data structure representation of a set of persistent obstacles in the environment, the data structure representation of the set of persistent obstacles in the environment including the representation of a first number of obstacles for which a respective volume in the environment occupied by each of the obstacles of the first number of obstacles is known at the configuration time; and during a run time, for each of at least a first number of poses of the robot, determining, by at least one set of circuitry, whether any portion of the robot will collide with another portion of the robot based at least in part on the data structure representation of the robot;

for each of at least a second number of poses of the robot, determining, by at least one set of circuitry, whether any portion of the robot will collide with any persistent obstacles in an environment in which the robot operates based at least in part on the data structure representation of the set of persistent obstacles in the environment;

for each of at least a third number of poses of the robot, determining, by at least one set of circuitry, whether any portion of the robot will collide with any transient obstacles in the environment based at least in part on a data structure representation of a set of transient obstacles in the environment, the data structure representation including a representation of a second number of obstacles in the environment, for which, a respective volume in the environment occupied by each of the obstacles of the second number of obstacles is known during at least some portion of the run time and for which the respective volume in the environment occupied by each of the obstacles is not known at the configuration time; and providing a signal that represents whether or not a collision has been detected for at least one of the poses.

2. The method of claim 1 wherein generating the data structure representation of the set of persistent obstacles in the environment comprises generating a hierarchy of bounding volumes.

3. The method of claim 2 wherein generating a hierarchy of bounding volumes comprises generating a hierarchy of bounding boxes with triangle meshes as leaf nodes.

4. The method of claim 2 wherein generating a hierarchy of bounding volumes comprises generating a hierarchy of spheres.

5. The method of claim 2 wherein generating a hierarchy of bounding volumes comprises generating a k-ary sphere tree.

6. The method of claim 2 wherein generating a hierarchy of bounding volumes comprises generating a hierarchy of axis-aligned bounding boxes, or a hierarchy of oriented bounding boxes.

7. The method of claim 1 wherein generating the data structure representation of the set of persistent obstacles in the environment comprises generating an octree that stores voxel occupancy information that represents the set of persistent obstacles in the environment.

8. The method of claim 1 wherein generating the data structure representation of the robot comprises generating a k-ary tree.

9. The method of claim 1 wherein generating the data structure representation of the robot comprises for each of a number of links of the robot, generating a respective k-ary tree.

10. The method of claim 1 wherein generating the data structure representation of the robot comprises for each of a number of links of the robot, generating a respective 8-ary tree with a tree depth equal to or greater than four.

11. The method of claim 1 wherein generating the data structure representation of the robot comprises for each of a number of links of the robot, generating a respective k-ary tree, where each node of the k-ary tree is a sphere that is identified as occupied if any portion of the respective sphere is occupied.

12. The method of claim 1 wherein the robot comprises a robotic appendage, and further comprising:

for a motion of the robot appendage between a first pose of the robot appendage and a second pose of the robot appendage, computing a plurality of intermediate poses of the robot appendage, the plurality of intermediate poses between the first and the second poses of the robot appendage in a C-space of the robotic appendage, until a dimension between a number of pairs of successively adjacent poses in the C-space satisfies a received value for a motion subdivision granularity, the motion subdivision granularity being a maximum spacing that is acceptable for a particular problem.

13. The method of claim 12 wherein computing a plurality of intermediate poses of the robot appendage includes:

for each of a number of joints of the robotic appendage, interpolating between a respective position and orientation for the joint in the first and the second poses to obtain an $n^{th}$ intermediate pose; and for each of the joints of the robotic appendage iteratively interpolating between a respective position and orientation for the joint in a respective pair of nearest neighbor poses for a respective $i^{th}$ iteration until an end condition is reached.

14. The method of claim 13 wherein the end condition is a distance between successively adjacent poses that satisfies motion subdivision granularity to obtain an nth intermediate pose, and further comprising:

for a number of the iterations, determining whether the end condition has been reached.

15. The method of claim 12, further comprising:

for each of a number of the poses, performing forward kinematics on the kinematic robot model to compute a number of transforms of each link of the robotic appendage.

16. The method of claim 1 wherein at least one of: determining whether any portion of the robot will collide with another portion of the robot, determining whether any portion of the robot will collide with any persistent obstacles, or determining whether any portion of the robot will collide with any transient obstacles comprises determining based on the hierarchical representation of the robot and based on a Euclidean Distance Field representation of the environment, collision detection starting at a root of the tree hierarchical representation and working towards leaf nodes, where if there are intersections at a non-leaf node level, the collision detection proceeds down to a next level of the hierarchical tree representation.

17. A system to generate collision assessments useful in motion planning for robotics, the system comprising:

at least one processor;

at least one non-transitory processor-readable medium that stores at least one of processor-executable instructions or data which, when executed by the at least one processor, causes the at least one processor to:

during a configuration time,
for a robot represented by a kinematic model, generate the data structure representation of the robot, the data structure representation of the robot in a form of a hierarchical tree structure; and
for an environment, generate a data structure representation of a set of persistent obstacles in the environment, the data structure representation of the set of persistent obstacles in the environment including the representation of a first number of obstacles for which a respective volume in the environment occupied by each of the obstacles of the first number of obstacles is known at the configuration time; and
during a run time,
for each of at least a first number of poses of the robot, determine whether any portion of the robot will collide with another portion of the robot based at least in part on the data structure representation of the robot;
for each of at least a second number of poses of the robot, determine whether any portion of the robot will collide with any persistent obstacles in an environment in which the robot operates based at least in part on the data structure representation of the set of persistent obstacles in the environment;
for each of at least a third number of poses of the robot, determine whether any portion of the robot will collide with any transient obstacles in the environment based at least in part on a data structure representation of a set of transient obstacles in the environment, the data structure representation including a representation of a second number of obstacles in the environment, for which, a respective volume in the environment occupied by each of the obstacles of the second number of obstacles is known during at least some portion of the run time and for which the respective volume in the environment occupied by each of the obstacles is not known at the configuration time; and
provide a signal that represents whether or not a collision has been detected for at least one of the poses.

18. The system of claim 17 wherein to generate the data structure representation of the set of persistent obstacles in the environment the at least one processor generates a hierarchy of bounding volumes.

19. The system of claim 18 wherein to generate a hierarchy of bounding volumes the at least one processor generates a hierarchy of bounding boxes with triangle meshes as leaf nodes.

20. The system of claim 18 wherein to generate a hierarchy of bounding volumes the at least one processor generates a hierarchy of spheres.

21. The system of claim 18 wherein to generate a hierarchy of bounding volumes the at least one processor generates a k-ary sphere tree.

22. The system of claim 18 wherein to generate a hierarchy of bounding volumes the at least one processor generates a hierarchy of axis-aligned bounding boxes.

23. The system of claim 18 wherein to generate a hierarchy of bounding volumes the at least one processor generates a hierarchy of oriented bounding boxes.

24. The system of claim 17 wherein to generate the data structure representation of the set of persistent obstacles in the environment the at least one processor generates an octree that stores voxel occupancy information that represents the set of persistent obstacles in the environment.

25. The system of claim 17 wherein to generate the data structure representation of the robot the at least one processor generates a k-ary tree.

26. The system of claim 17 wherein to generate the data structure representation of the robot the at least one processor generates a respective k-ary tree for each of a number of links of the robot.

27. The system of claim 17 wherein to generate the data structure representation of the robot the at least one processor generates a respective 8-ary tree for each of a number of links of the robot.

28. The system of claim 17 wherein to generate the data structure representation of the robot the at least one processor generates a respective 8-ary tree with a tree depth equal to or greater than four for each of a number of links of the robot.

29. The system of claim 17 wherein to generate the data structure representation of the robot the at least one processor generates a respective k-ary tree for each of a number of links of the robot, where each node of the k-ary tree is a sphere that is identified as occupied if any portion of the respective sphere is occupied.

30. The system of claim 17 wherein the robot comprises a robotic appendage, and wherein execution of the at least one of processor-executable instructions or data further cause the at least processor to:
for a motion of the robot appendage between a first pose of the robot appendage and a second pose of the robot appendage, compute a plurality of intermediate poses of the robot appendage, the plurality of intermediate poses between the first and the second poses of the robot appendage in a C-space of the robotic appendage, until a dimension between a number of pairs of successively adjacent poses in the C-space satisfies a received value for a motion subdivision granularity, the motion subdivision granularity being a maximum spacing that is acceptable for a particular problem.

31. The system of claim 30 wherein to compute a plurality of intermediate poses of the robot appendage the at least one processor:
for each of a number of joints of the robotic appendage, interpolate between a respective position and orientation for the joint in the first and the second poses to obtain an $n^{th}$ intermediate pose; and
for each of the joints of the robotic appendage iteratively interpolates between a respective position and orientation for the joint in a respective pair of nearest neighbor poses for a respective $i^{th}$ iteration until an end condition is reached.

32. The system of claim 31 wherein the end condition is a distance between successively adjacent poses that satisfies motion subdivision granularity to obtain an nth intermediate pose, and wherein execution of the at least one of processor-executable instructions or data further cause the at least processor to:
for a number of the iterations, determine whether the end condition has been reached.

33. The system of claim 30 wherein execution of the at least one of processor-executable instructions or data further cause the at least processor to:
for each of a number of the poses, perform forward kinematics on the kinematic robot model to compute a number of transforms of each link of the robotic appendage.

34. The system of claim 17 wherein at least one of: the determination of whether any portion of the robot will collide with another portion of the robot, the determination of whether any portion of the robot will collide with any persistent obstacles, or the determination of whether any portion of the robot will collide with any transient obstacles comprises a determination based on the hierarchical representation of the robot and based on a Euclidean Distance Field representation of the environment, collision detection which starts at a root of the tree hierarchical representation and works towards a number of leaf nodes, where if there are intersections at a non-leaf node level, the collision detection proceeds down to a next level of the hierarchical tree representation.

* * * * *